United States Patent
Agrawal et al.

(10) Patent No.: US 12,266,341 B1
(45) Date of Patent: Apr. 1, 2025

(54) SENDING MEDIA COMMENTS USING A NATURAL LANGUAGE INTERFACE

(71) Applicant: Amazon Technologies, Inc., Seattle, WA (US)

(72) Inventors: Shubhendra Agrawal, Seattle, WA (US); Nikhila Bhat, Issaquah, WA (US); Saurabh Rajnath Chaurasia, Kirkland, WA (US); Saurav Kachhwaha, Bellevue, WA (US); Yeqing Wang, Bellevue, WA (US); Supraj Kolluri, Bothell, WA (US); Abhinaw Dixit, Redmond, WA (US); Prateek Ramesh Chandra Shah, Issaquah, WA (US); Michelle Susan Gaseor, Seattle, WA (US); Edward Hein-Ho Tsang, Seattle, WA (US); Aaron Lamar Wilson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 293 days.

(21) Appl. No.: 18/081,926

(22) Filed: Dec. 15, 2022

(51) Int. Cl.
*G10L 13/027* (2013.01)
*G06F 3/16* (2006.01)
*G10L 15/18* (2013.01)

(52) U.S. Cl.
CPC ............ *G10L 13/027* (2013.01); *G06F 3/167* (2013.01); *G10L 15/1815* (2013.01)

(58) Field of Classification Search
CPC .... G10L 13/027; G10L 15/1815; G06F 3/167
See application file for complete search history.

(56) References Cited

U.S. PATENT DOCUMENTS 10,091,545 B1 * 10/2018 Cwik ............. H04N 21/234336
10,271,093 B1 * 4/2019 Jobanputra .......... H04N 21/835

\* cited by examiner

*Primary Examiner* — Ibrahim Siddo
(74) *Attorney, Agent, or Firm* — Pierce Atwood LLP

(57) ABSTRACT

A system may provide a voice user interface (VUI) for sending a media comment (e.g., brief clips of audio data representing speech) to a media content creator such as a podcaster, talk show, music app, etc. The system can identify a destination for the media comment based on context (e.g., an identifier corresponding to media content currently or recently output by a user device) and/or via voice dialog with the user. Content creators can invite, receive, and play users' media comments on the show, thereby increasing audience engagement. A media comment may include a request for or dedication of a song, a "shout out" to another listener, a story/opinion, a question, a response to a poll, a contest entry, etc.

20 Claims, 14 Drawing Sheets

SENDING MEDIA COMMENTS USING A NATURAL LANGUAGE INTERFACE

BACKGROUND

Speech recognition systems have progressed to the point where humans can interact with computing devices entirely relying on speech. Such systems employ techniques to identify the words spoken by a Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech processing may also involve generating synthesized speech from, for example, text.

Speech processing and synthesis may be used by computers, hand-held devices, telephone computer systems, kiosks, and a wide variety of other devices to improve human-computer interactions, including in the absence of a natural language voice user interface.

BRIEF DESCRIPTION OF DRAWINGS

For a more complete understanding of the present disclosure, reference is now made to the following description taken in conjunction with the accompanying drawings.

DETAILED DESCRIPTION

Figure 1:
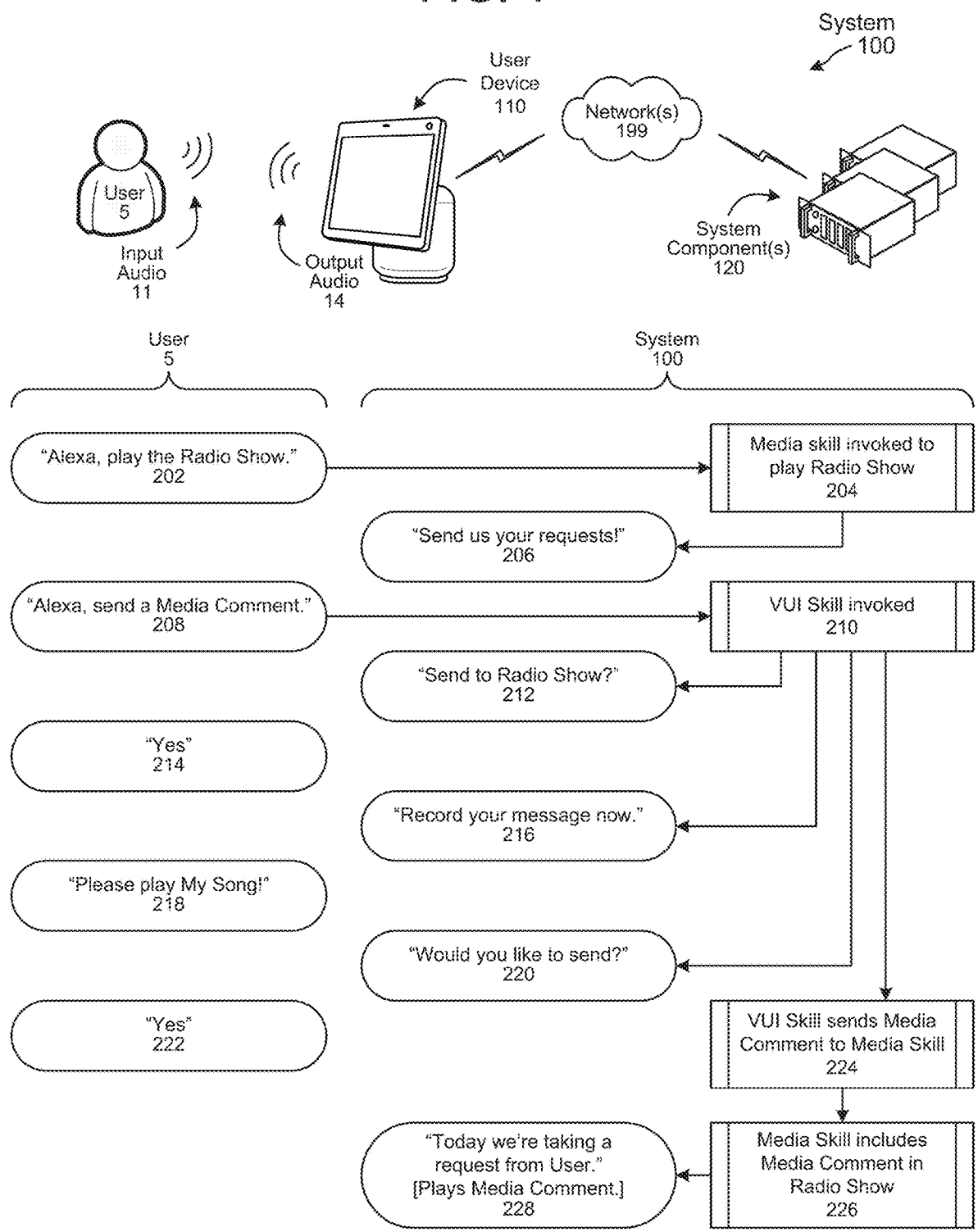
FIG. 1 illustrates a system configured for sending media comment data using a natural language interface, according to embodiments of the present disclosure.

Speech processing systems and speech generation systems have been combined with other services to create virtual "assistants" that a user can interact with using natural language inputs such as speech, text inputs, or the like. The virtual assistant may leverage one or more computerized voice-enabled technologies. Automatic speech recognition (ASR) is a field of computer science, artificial intelligence, and linguistics concerned with transforming audio data associated with speech into data representing words of that speech. Similarly, natural language understanding (NLU) is a field of computer science, artificial intelligence, and linguistics concerned with enabling computers to derive meaning from input containing natural language. ASR and NLU are often used together as part of a speech processing system, sometimes referred to as a spoken language understanding (SLU) system. Natural Language Generation (NLG) includes enabling computers to generate output text or other data in words a human can understand, such as sentences or phrases. Text-to-speech (TTS) is a field of computer science concerning transforming textual and/or other meaning representation data into audio data that is synthesized to resemble human speech. A speech processing system may use one or more of ASR, NLU, NLG, and/or TTS to perform the function of a virtual assistant to perform tasks for and/or on behalf of the user. The user may interact with the system using a voice user interface (VUI), through which the user can input spoken commands and receive responses in the form of synthesized speech.

The system may process a user's spoken command and provide a response and/or perform some other requested action. For example, upon request, the system may provide the user with access to media such as a radio music and/or talk show, podcast, television episode, movie, sports broadcast, and/or other content. Content creators, such as those offering such shows (e.g., hosts, DJs, on-air personalities, etc.) may wish to increase audience engagement by promoting audience participation. For example, creators may wish to offer audience members an opportunity to "call in" or otherwise interact with the creator and/or have their voice or other contribution played "on air."

Offered are systems and methods that enable content creators to invite and receive media comments from audience members via a speech processing system. The speech processing system may process and manage data related to media comments to facilitate routing media comment data to a content provider. Invitations for audience participation may be for responses such as for song requests, contest entries, poll responses, shout-outs, trivia answers, questions for panelists, jokes, shared facts, etc. An audience member (e.g., a user) may, via a voice command, tell a user device that they wish to send a media comment. A media comment may be a brief (e.g., 10 to 60 seconds) segment of recorded speech and/or other audio. In some implementations, the media comment may include video; for example, a video of the user speaking to (or even performing for) the camera of their device. The user may initiate sending media comment by saying: "Alexa, send a media comment." The speech processing system may process available context data related to the user's device(s), profile, etc. to determine what content the user's device is currently playing back (e.g., which radio show, podcast, etc.), and thus identify a system or component to receive the media comment data. Additionally or alternatively, the system may engage in a dialog with the user to identify a receiver of the media comment data.

In some implementations, the system may offer the user additional options, via the VUI, to review, delete, re-record, and/or send the media comment. Once the user approves the media comment (e.g., by selecting "Send"), the system may transcribe the media comment and process the transcript (and/or underlying audio data) to detect potential content violations (e.g., personally identifiable information (PII), profanity, etc.). The system may then send the media comment data to the identified receiver. The creator may then playback the media comment during the live show or subsequent show.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

Figure 2:
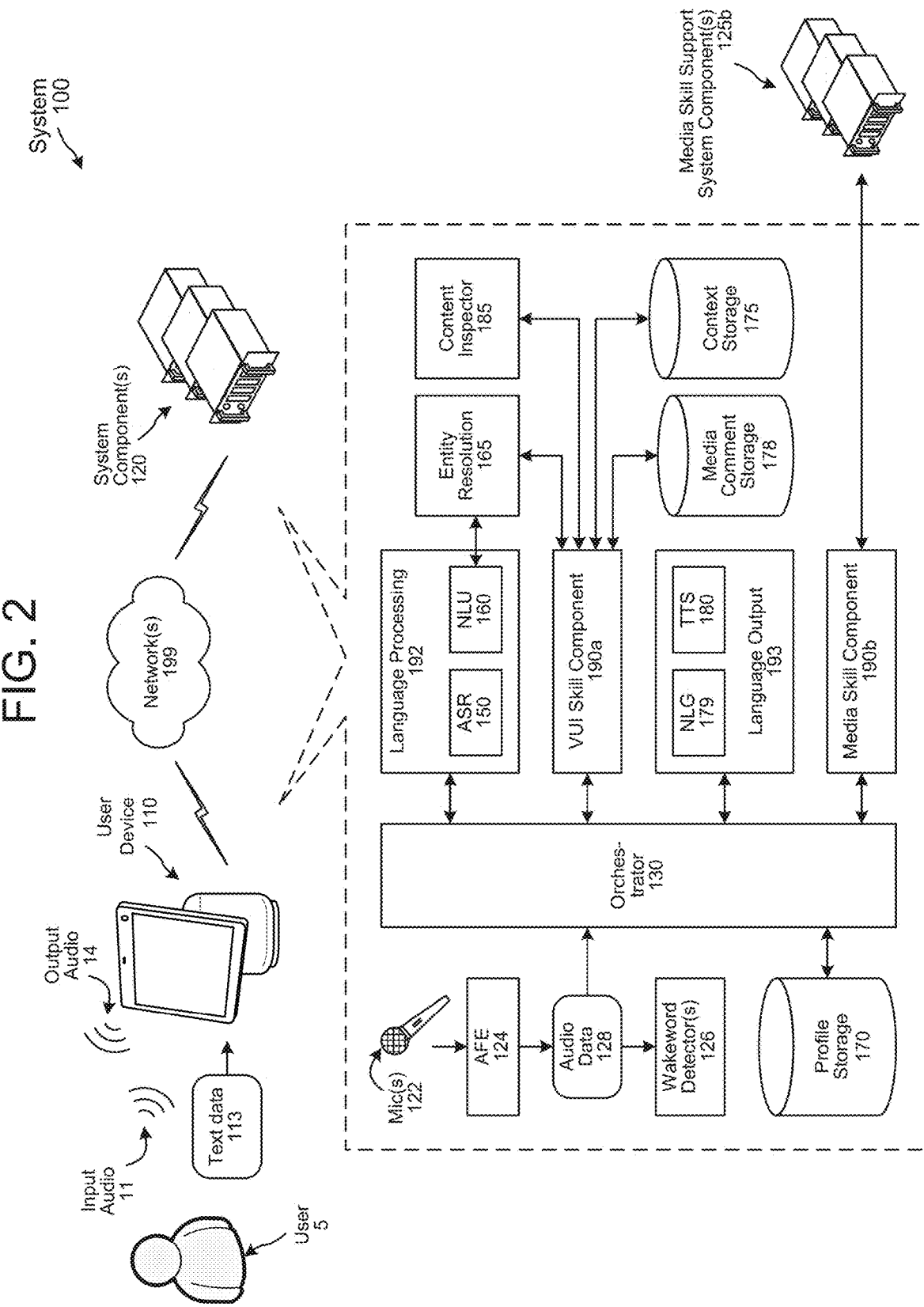
FIG. 2 is a conceptual diagram illustrating components of the system, according to embodiments of the present disclosure.
Figure 14:
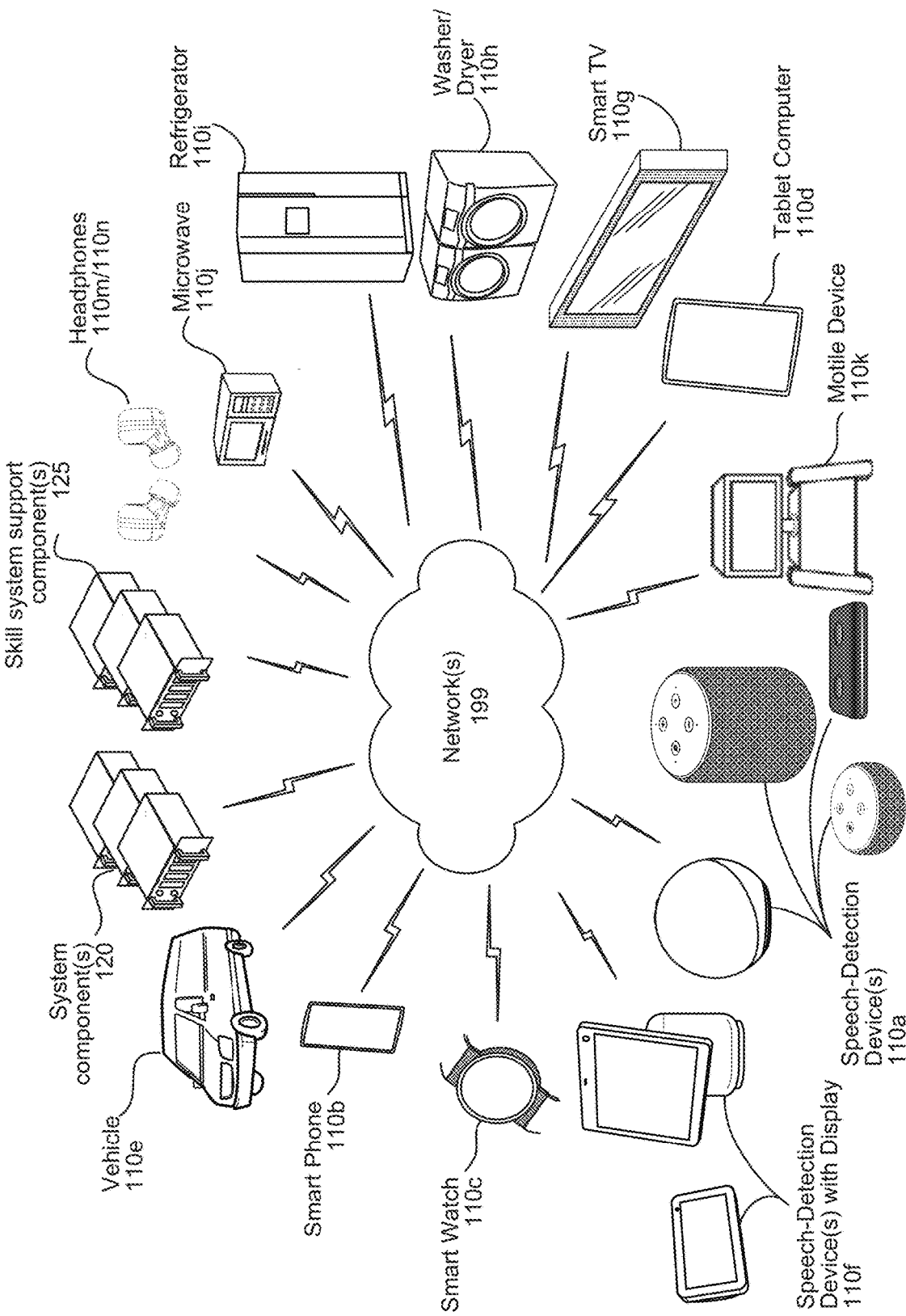
FIG. 14 illustrates an example of a computer network for use with the overall system, according to embodiments of the present disclosure.

FIG. 1 illustrates a system configured for sending media comment data using a natural language interface of a virtual assistant system 100, according to embodiments of the present disclosure. As shown in FIG. 1, the virtual assistant system 100 (or "system 100") may include a user device 110 local to a user 5, one or more system component(s) 120 (abbreviated "system component(s) 120"), and one or more skill support system component(s) 125 (as shown in FIGS. 2 and 14; e.g., the media skill support system component(s) 125b shown in FIG. 2) connected across one or more networks 199. Although the figures and discussion of the present disclosure illustrate certain steps in a particular order, the steps described may be performed in a different order (as well as certain steps removed or added) without departing from the present disclosure.

Figure 12:
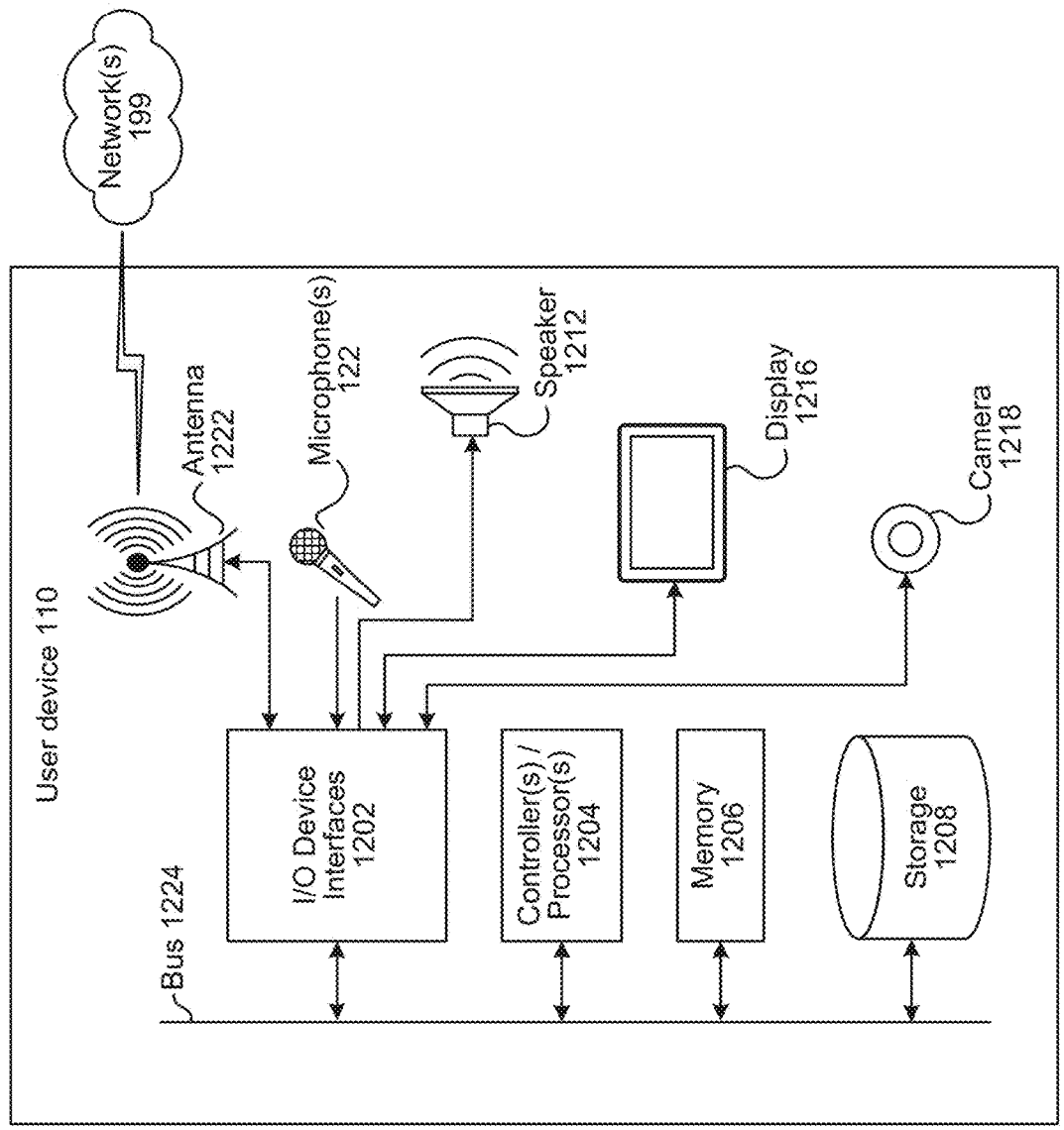
FIG. 12 is a block diagram conceptually illustrating example components of a device, according to embodiments of the present disclosure.
Figure 13:
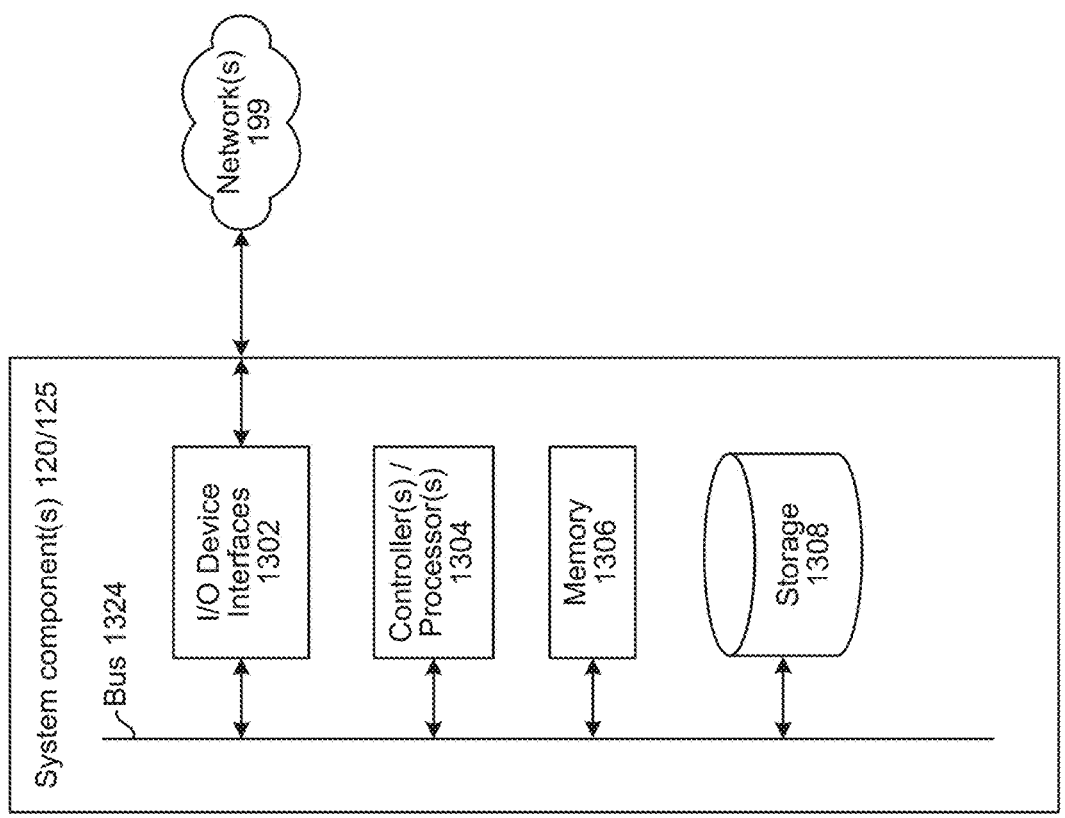
FIG. 13 is a block diagram conceptually illustrating example components of a system, according to embodiments of the present disclosure.

The device 110 may receive input audio 11 corresponding to a spoken natural language input originating from the user 5. The device 110 may process audio 11 following detection of a wakeword. The device 110 may generate audio data corresponding to the audio, and may process it via the components shown in FIGS. 1 and 2. Various components may reside on the user device 110, on one or more system components 120, or divided and/or duplicated between the two. An application installed on the user device 110 may be associated with the system component(s) 120 and provide the user with an interface (e.g., a VUI) for interacting with the user device 110 and/or the system component(s) 120. An example of such an application is the Amazon Alexa application, which may be installed on a smart phone, tablet, or the like. In some implementations, the user device 110 may receive text data 113 corresponding to a natural language input originating from the user 5, and the user device 110 and/or the system component(s) 120 may process it. The user device 110 may also generate output data and/or receive it from the system component(s) 120, and generate a synthesized speech output. The synthesized speech, along with other audio data, may be output to the user as output audio 14. Additional hardware features of a user device 110 are illustrated in FIG. 12. Additional hardware features of a system component 120 are illustrated in FIG. 13. Examples of various user devices 110 and their connections to system component(s) 120 and/or skill support system component(s) are further illustrated in FIG. 14. The system component(s) 120 may be remote system such as a group of computing components located geographically remote from user device 110 (e.g., "in the cloud") but accessible via network 199 (for example, servers accessible via the internet). The system component(s) 120 may also include a remote system that is physically separate from device 110 but located geographically close to device 110 and accessible via network 199 (for example a home server located in a same residence as device 110). The system component(s) 120 may also include some combination thereof, for example where certain components/operations are performed via a home server(s) and others are performed via a geographically remote server(s).

The user 5 may interact with the virtual system 100 for various purposes including receiving media content over the network 199 (sometimes colloquially referred to as "streaming") such as radio shows, podcasts, TV shows, movies, sporting events, etc. The user 5 may speak a command to the user device 110, "Alexa, play the Radio Show." The system 100 may process the command using language processing components 192 (including an ASR component 150 and/or an NLU component 160) to determine an intent and one or more entities represented in the command. For example, the intent may be <PlayRadio> and the entity may be <Radio_Show>. The system 100 may identify a skill component 190 (such as the media skill component 190b) corresponding to a media content creator of the Radio Show. The media skill component 190b, possibly in conjunction with additional hardware resources provided by one or more media skill support system component(s) 125b, may provide audio data representing the Radio Show for output from the user device 110.

In some cases, the media content creator may wish to increase audience engagement with the Radio Show. To that end, the creator may invite participation from the audience in the form of Media comments—e.g., brief clips of audio of the user's voice—for playback during the current or future episode of the show. The present system allows for such audio comments input to the virtual assistant system 100 to be processed and routed properly. Specifically, the user 5 may use command the virtual assistant system 100 to record and send the media comment via the VUI. The VUI may be provided by one or more different components of the system 100 such as a VUI skill component 190a (also referred to as a "voice skill" and which, in some implementations, may operate in conjunction with one or more VUI skill support system components 125a (not shown)).

The VUI skill component 190a may enable and/or provide customizable logic for conversational dialogs to process user commands, request information, offer options, and otherwise interact with the user 5 to obtain the media comment audio data and send it to the desired destination such as the media skill component 190b or other component. The VUI skill component 190a may leverage language processing components 192 and/or language output components 193 (including, in some implementations, a dialog manager 172) to generate synthesized speech for output to the user 5. In some implementations, the system 100 may include additional skill components 190 and/or skill support components 125, with which a user 5 may interact directly and/or using the VUI skill component 190a.

FIG. 1 illustrates an example user interaction with the virtual assistant system 100 to send a media comment, according to embodiments of the present disclosure. The user may, at 202, speak a request to the system to stream media content: "Alexa, play the Radio Show." The system 100 may, at 204, invoke a media skill (e.g., corresponding to the media skill component 190b), to play the Radio Show for the user. As the user device 110 outputs the Radio Show audio, the system 100 may store context data identifying the media currently being output (e.g., in the context storage component 175 described below). The stored context data may include, for example, a media content identifier uniquely identifying the episode of the Radio Show that the user device 110 is playing back. The stored context data may additionally or alternatively include a skill identifier corresponding to the media skill. The media content identifier and/or skill identifier may be included in metadata accompanying the media content. The context data may be used to fill in the blanks of, disambiguate, and/or otherwise parse a user command received during (or, in some cases, shortly after) output of the media content.

During the Radio Show, an on-air personality such as an MC, DJ, panelist, etc. may invite audience participation. If the show is one that plays music or take requests, the media content may, at 206, include an invitation to "Send us your requests!" Invitations for audience participation may be for other types of responses such as for contest entries, poll responses, shout-outs, trivia answers, questions for panelists, jokes, shared facts, etc.

A user may respond with a media comment. The user may, at 208, speak a command to the user device: "Alexa, send a media comment." Upon detecting the user's speech (and/or a wakeword in the user's speech), the system 100 may pause the media content playback or lower the volume of the playback so as not to interrupt the user. The system 100 may process the speech and, at 210, invoke a voice skill (e.g., corresponding to the VUI skill component 190a) to guide the user through recording and sending the media comment. The voice skill may retrieve the context data to identify a destination entity (e.g., media content creator and corresponding media skill component 190b) for the media comment.

The voice skill may, at 212, cause the user device 110 to output a request to confirm the entity: "Send message to Radio Show?" The user may, at 214, confirm the destination by saying, "Yes." The voice skill may, at 216, cause the user device 110 to output synthesized speech instructing the user to "Record your media comment now." The user may, at 218, speak their media comment, such as "Please play My Song!" The voice skill may receive and store the audio of the user's media comment (e.g., in a media comment storage component 178 as described below). The voice skill may, at 220, ask the user 5 to confirm that they would like to send the media comment as recorded. The voice skill may additionally offer the user options to review, delete, and/or re-record the media comment, as described further below with reference to FIGS. 3 through 6. The voice skill may off the options as part of a customized dialog session with the user by, for example, outputting synthesized speech and receiving and processing spoken responses. The user 5 may, at 222, confirm that the voice skill should send the media comment to the media skill by saying "Yes."

Once the user has confirmed their wish to send the media comment, the voice skill may, at 224, send the audio data of the media comment to the identified destination; in this case the media skill associated with the Radio Show. In some implementations, the voice skill may send the media comment data to a different system component; for example, one corresponding to the creator of the media content. In some cases, the media skill may host media content from multiple content creators. Thus, upon receiving confirmation to send the media content to the content creator, the voice skill may identify a system component associated with media content (which may be different from the system component associated with the media skill). The voice skill may send the media comment data to the system component associated with media content and/or send a notification to that system component indicating that a new media comment is available. The content creator may then retrieve the media comment data.

In some implementations, the system 100 may perform further processing to check the media comment for sensitive information such as PII (e.g., addresses, credit card numbers, social security numbers) and/or prohibited content such as profanity, obscenity, hate speech, etc., as defined by policy (e.g., terms and conditions of use).

Having received the media comment, the media content creator may present it during the show or a subsequent show. The media skill may thus, in 226, provide the media comment in the current and/or a subsequent episode of the Radio show. For example, an on-air personality may, at 228, present the song request: "Thank you for listening to Radio Show! Today we're taking a request from User." The creator may then play the media comment and/or the requested song. The media skill component 190b may include the audio data of the media comment in media content delivered to listeners of the Radio Show.

The system 100 includes various components for processing speech, generating synthesized speech, delivering media content, and receiving and forwarding media comments to media content creators. FIG. 2 is a conceptual diagram illustrating components of the system, according to embodiments of the present disclosure. The system 100 may operate using various components located on same or different physical devices (e.g., one or more user devices 110, system component(s) 120, and/or skill support system component(s) 125, etc.). Communication between various components may occur directly or across a network(s) 199. The device 110 may include audio capture component(s), such as a microphone 122 or array of microphones of a device 110, captures audio 11 and creates corresponding audio data. An acoustic front end (AFE) 124 may process the audio signal using a number of techniques, such as determining frequency-domain audio data by using a transform such as a fast Fourier transform (FFT) and/or determining a Mel-cepstrum. The AFE 124 may output audio data 128, which may be or include acoustic feature data corresponding to a representation of the input audio 11. The AFE 124 may process the audio signal to create acoustic feature data, which may include one or more acoustic-feature vectors such as log filterbank energies (LFBE) vectors. Other types of feature vectors may be similarly created and used; for example, the feature vectors may include Mel-frequency cepstrum coefficients (MFCCs).

The AFE 124 may include an analysis filterbank that processes one or more frames audio data (and/or other sequential input data). The audio data may be a digital representation of an analog audio signal, which may represent an utterance and/or an acoustic event. The analysis filterbank may include hardware, software, and/or firmware for converting the time-domain audio data of the audio data into frequency-domain audio data. This conversion may be performed by implementing a Fourier transform algorithm, such as a FFT or discrete-time Fourier transform (DTFT).

The analysis filterbank may further include two or more filters for separating the frequency range of the resultant frequency-domain audio data into two or more frequency ranges or bins. For example, the analysis filterbank may separate a frequency range of 20 Hz-20 kHz into 20 bins. The analysis filterbank may thus output M frequency ranges, wherein M may equal 20.

Once speech is detected in audio data 128 representing the audio 11, the device 110 may determine if the speech is directed at the device 110/system component 120. In at least some embodiments, such determination may be made using a wakeword detection component 126. The wakeword detection component 126 may be configured to detect various wakewords. In at least some examples, each wakeword may correspond to a name of a different digital assistant. An example wakeword/digital assistant name is "Alexa." In another example, input to the system may be in form of text data 113, for example as a result of a user typing an input into a user interface of device 110. Other input forms may include indication that the user has pressed a physical or virtual button on device 110, the user has made a gesture, etc. The device 110 may also capture images using camera(s) 1218 of the device 110 and may process the image data representing those image(s) on-device and/or send it to the system component(s) 120. The image data may include raw image data or image data processed by the device 110 before sending to the system component 120. The image data may be used in various manners by different components of the system to perform operations such as determining whether a user is directing an utterance to the system, interpreting a user command, responding to a user command, etc.

The wakeword detector 126 of the device 110 may process the audio data, representing the audio 11, to determine whether speech is represented therein. The device 110 may use various techniques to determine whether the audio data includes speech. In some examples, the device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a classifier configured to distinguish speech from background noise. The classifier may be implemented by techniques such as linear classifiers, support vector machines, and decision trees. In still other examples, the device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 126 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 126 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detector 126 and/or input is detected by an input detector, the device 110 may "wake" and begin transmitting audio data 128, representing the audio 11, to the system component(s) 120. The audio data 128 may include data corresponding to the wakeword; in other embodiments, the portion of the audio corresponding to the wakeword is removed by the device 110 prior to sending the audio data 128 to the system component(s) 120. In the case of touch input detection or gesture based input detection, the audio data may not include a wakeword.

In some implementations, the system 100 may include more than one system component 120. The system components 120 may respond to different wakewords and/or perform different categories of tasks. Each system component 120 may be associated with its own wakeword such that speaking a certain wakeword results in audio data be sent to and processed by a particular system. For example, detection of the wakeword "Alexa" by the wakeword detector 126 may result in sending audio data to system component 120a for processing while detection of the wakeword "Computer" by the wakeword detector may result in sending audio data to system component 120b for processing. The system may have a separate wakeword and system for different skills/systems (e.g., "Dungeon Master" for a game play skill/system component 120c) and/or such skills/systems may be coordinated by one or more skill component(s) 190 of one or more system components 120.

Upon receipt by the system component(s) 120, the audio data 128 may be sent to an orchestrator component 130. The orchestrator component 130 may include memory and logic that enables the orchestrator component 130 to transmit various pieces and forms of data to various components of the system, as well as perform other operations as described herein.

The orchestrator component 130 may send the audio data 128 to language processing components 192. The language processing components 192 (sometimes also referred to as a spoken language understanding (SLU) component) includes an automatic speech recognition (ASR) component 150 and a natural language understanding (NLU) component 160. The ASR component 150 may transcribe the audio data 128 into text data. The text data output by the ASR component 150 represents one or more than one (e.g., in the form of an N-best list) ASR hypotheses representing speech represented in the audio data 128. The ASR component 150 interprets the speech in the audio data 128 based on a similarity between the audio data 128 and pre-established language models. For example, the ASR component 150 may compare the audio data 128 with models for sounds (e.g., acoustic units such as phonemes, senons, phones, etc.) and sequences of sounds to identify words that match the sequence of sounds of the speech represented in the audio data 128. The ASR component 150 sends the text data generated thereby to an NLU component 160, via, in some embodiments, the orchestrator component 130. The text data sent from the ASR component 150 to the NLU component 160 may include a single top-scoring ASR hypothesis or may include an N-best list including multiple top-scoring ASR hypotheses. An N-best list may additionally include a respective score associated with each ASR hypothesis represented therein. The ASR component 150 is described in greater detail below with regard to FIG. 7.

The language processing components 192 may further include a NLU component 160. The NLU component 160 may receive the text data from the ASR component. The NLU component 160 may attempts to make a semantic interpretation of the phrase(s) or statement(s) represented in the text data input therein by determining one or more meanings associated with the phrase(s) or statement(s) represented in the text data. The NLU component 160 may determine an intent representing an action that a user desires be performed and may determine information that allows a device (e.g., the device 110, the system component(s) 120, a skill component 190, a skill system component(s) 125, etc.) to execute the intent. For example, if the text data corresponds to "play the 5th Symphony by Beethoven," the NLU component 160 may determine an intent that the system output music and may identify "Beethoven" as an artist/composer and "5th Symphony" as the piece of music to be played. For further example, if the text data corresponds to "what is the weather," the NLU component 160 may determine an intent that the system output weather information associated with a geographic location of the device 110. In another example, if the text data corresponds to "turn off the lights," the NLU component 160 may determine an intent that the system turn off lights associated with the device 110 or the user 5. However, if the NLU component 160 is unable to resolve the entity—for example, because the entity is referred to by anaphora such as "this song" or "my next appointment"—the language processing components 192 can send a decode request to another language processing components 192 for information regarding the entity mention and/or other context related to the utterance. The language processing components 192 may augment, correct, or base results data upon the audio data 128 as well as any data received from the other language processing components 192.

The NLU component 160 may return NLU results data 985/925 (which may include tagged text data, indicators of intent, etc.) back to the orchestrator 130. The orchestrator 130 may forward the NLU results data to a skill component(s) 190. If the NLU results data includes a single NLU hypothesis, the NLU component 160 and the orchestrator component 130 may direct the NLU results data to the skill component(s) 190 associated with the NLU hypothesis. If the NLU results data 985/925 includes an N-best list of NLU hypotheses, the NLU component 160 and the orchestrator component 130 may direct the top scoring NLU hypothesis to a skill component(s) 190 associated with the top scoring NLU hypothesis. The system may also include a post-NLU ranker 965 which may incorporate other information to rank potential interpretations determined by the NLU component 160. The local device 110 may also include its own post-NLU ranker, which may operate similarly to the post-NLU ranker 965. The NLU component 160, post-NLU ranker 965 and other components are described in greater detail below with regard to FIGS. 8 and 9.

A skill component may be software running on the system component(s) 120 that is akin to a software application. That is, a skill component 190 may enable the system component(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system component(s) 120 may be configured with more than one skill component 190. For example, a weather service skill component may enable the system component(s) 120 to provide weather information, a car service skill component may enable the system component(s) 120 to book a trip with respect to a taxi or ride sharing service, a restaurant skill component may enable the system component(s) 120 to order a pizza with respect to the restaurant's online ordering system, etc. A skill component 190 may operate in conjunction between the system component(s) 120 and other devices, such as the device 110, in order to complete certain functions. Inputs to a skill component 190 may come from speech processing interactions or through other interactions or input sources. A skill component 190 may include hardware, software, firmware, or the like that may be dedicated to a particular skill component 190 or shared among different skill components 190.

A skill support system component(s) 125 may communicate with a skill component(s) 190 within the system component(s) 120 and/or directly with the orchestrator component 130 or with other components. A skill support system component(s) 125 may be configured to perform one or more actions. An ability to perform such action(s) may sometimes be referred to as a "skill." That is, a skill may enable a skill support system component(s) 125 to execute specific functionality in order to provide data or perform some other action requested by a user. For example, a weather service skill may enable a skill support system component(s) 125 to provide weather information to the system component(s) 120, a car service skill may enable a skill support system component(s) 125 to book a trip with respect to a taxi or ride sharing service, an order pizza skill may enable a skill support system component(s) 125 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 120 may be configured with a skill component 190 dedicated to interacting with the skill support system component(s) 125. Unless expressly stated otherwise, reference to a skill, skill device, or skill component may include a skill component 190 operated by the system component(s) 120 and/or skill operated by the skill support system component(s) 125. Moreover, the functionality described herein as a skill or skill may be referred to using many different terms, such as an action, bot, app, or the like. The skill component 190 and or skill support system component(s) 125 may return output data to the orchestrator 130.

An example skill component is the media skill component 190*b*. The media skill component 190*b* may enable the media skill support system component(s) 125*b* to send media content to a user device 110 upon request. The media skill component 190*b* may represent a single content creator or multiple content creators. For example, the media skill component 190*b* may correspond to a single show (e.g., radio show, news show, talk show, podcast) or to multiple shows (e.g., on a same "app", "channel", or "network"). Content creators may create content episodically (e.g., producing a show in advance and making it available on or after a scheduled time) and/or live (e.g., for users to stream in real-time or on a relatively short delay). Each show may correspond to a unique name, number, and/or identifier(s) such as a media content identifier and/or an entity identifier that allows a show to be identified and selected unambiguously using the VUI, and for storing context data that indicates which media content has been or is being output by a user device 110. Such context data may be used by the VUI skill component 190*a* to identify a destination of a media comment.

Another example skill component is the VUI skill component 190*a*. The VUI skill component 190*a* may enable and/or provide customizable logic for conversational dialogs to process user commands, request information, offer options, and otherwise interact with the user 5 to obtain the media comment audio data and send it to the desired destination (e.g., the media skill component 190*b* or other component). In some implementations, the VUI skill component 190*a* may retrieve context data from the context storage component 175 to determine a destination for the media comment (e.g., based on media content currently being output by the user device 110). In some implementations, the user device 110 may, upon outputting media content, send corresponding context data to the context storage component 175. In some implementations, the context storage component 175 may request context data from the user device 110 upon receiving a request for context data from the VUI skill component 190*a* (and/or other skill component(s) 190). In some implementations, the VUI skill component 190*a* may leverage an entity resolution component 165 to identify a particular media content and/or media content provider named by the user 5 in the request. For example, if the user says "Alexa, send a media comment to Radio Show", the entity resolution component 165 may resolve "the Radio Show" to determine a corresponding skill identifier. The VUI skill component 190*a* may use the skill identifier to route the media comment to the appropriate skill component 190. The VUI skill component 190*a* may store and retrieve audio and/or text data representing the media comment from a media comment storage component 178. In some implementations, the VUI skill component 190*a* may and/or check the media comment for prohibited content (e.g., PII and/or obscenities). The VUI skill component 190*a* may also leverage language input components 192 (e.g., the ASR component 150 and/or the NLU component 160), the language output components 193 (e.g., the NLG component 179 and/or the TTS component 180), and/or the dialog manager component 172 to process user speech and generate synthesized speech for output to the user 5. The VUI skill component 190*a* may leverage other components to perform actions for and/or on behalf of the user 5. For example, the VUI skill component 190*a* may interact with the entity resolution component 165. The VUI skill component 190*a* may share the entity resolution component 165 with the language processing components 192 (e.g., the NLU component 160). Further details of the entity resolution component 165 are described below with reference to FIG. 9. In some implementations, the system 100 may include additional skill components 190 and/or skill support components 125, with which a user 5 may interact directly and/or using the VUI skill component 190*a*. Similar to the media skill component 190*b*, the VUI skill component 190*a* may operate in conjunction with the VUI skill support system component(s) 125*a* (not shown).

The VUI skill component 190*a* may use the content inspection component 185 to check media comment data for prohibited content. Prohibited content may be defined by policies such as business logic. Examples of prohibited content may include, for example and without limitation, PII such as credit card numbers, phone numbers, social security numbers, and/or addresses; obscenity such as may be inappropriate for general audiences; profanity; etc. In some implementations, additional types of content may be screened based on local rules, regulations, and/or policies of particular content creators. The VUI skill component 190*a* may obtain a transcript from, for example, the ASR component 150. The transcript may be in the form of text data and/or other form of ASR data. The content inspection component 185 may process the transcript and identify any prohibited content. In some implementations, the prohibited content may be removed from the media comment data (e.g., by removing a portion of audio data corresponding to a portion of the transcript determined to represent prohibited content). The content inspection component 185 may include one or more machine learning components that may, based on training using labeled datasets, detect various categories of prohibited. In some implementations, the content inspection component may determine a confidence score representing a likelihood that a type of prohibited content is present. In some implementations, the content inspection component 185 may return a flag or other data indicating that the media comment data does or does not include prohibited content. In some implementations, the content inspection component 185 may apply thresholding to the confidence score(s), and return a flag if the confidence score exceeds the threshold. The threshold value and/or the model(s) implemented by the content inspection component 185 may be adjusted and/or retrained periodically and/or occasionally as new data is collected. Based on the indication received from the content inspection component 185, the VUI skill component 190*a* may determine whether or not to forward the media comment data to the media skill component 190*b* (or other specified destination).

The VUI skill component 190*a* may store and retrieve data (including audio and/or text data representing media comments) in a media comment storage component 178. For example, after receiving the media comment data, the VUI skill component 190*a* may store it in the media comment storage component 178 while the VUI skill component 190*a* performs other operations such as allowing the user to review, edit, and/or delete the media comment data, or confirm that it is to be sent to the destination. The VUI skill component 190*a* may store the media comment data in the media comment storage component 178 during the time when the content inspection component 185 is checking the transcript of the media comment for prohibited content. Once the media comment data has been checked and confirmed for delivery to the destination, the VUI skill component 190*a* may forward the media comment data (e.g., audio data) to the media skill component 190*b* directly, or send a pointer or other indication of the location of the media comment data and/or otherwise provide the media skill component 190b with access to the media comment data. In some implementations, the VUI skill component 190a may send a notification to the media skill component 190b, other device or component associated with the media content creator, a skill component or application for media comment management accessible to the content creator, or similar endpoint indicating that new media comment data is available.

The VUI skill component 190a may store and retrieve context data from the context storage component 175. For example, the user device 110 may send a media content identifier to the context storage component 175 when it begins outputting a piece of media content. Additionally or alternatively, the context storage component 175 may query the user device 110 for a current context upon receive a request for context data from the VUI skill component 190a. The VUI skill component 190a may use the media content identifier to, for example, identify a destination for a media comment if the user does not name the destination explicitly or unambiguously. In some implementations, the VUI skill component 190a may cause the user device 110 to output a request that the user confirm the destination of the media comment so as to prevent sharing user audio with an unintended destination.

In some implementations, the context storage component 175 may receive other data from other sources. For example, the context data may include identifiers determined based on watermarks (e.g., audio signals that are inaudible to humans but which contain encoded information that the system 100 can decode). In some implementations, the system 100 can identify media content by its human-audible sound content. This may allow the VUI skill component 190a to identify a possible destination for the media comment when the destination corresponds to media content output by a device other than the user device 110. For example, the user device 110 may be a user's smartphone with which the user sends a media comment while listening to (and/or watching) media content delivered via another device such as smart speaker or television. In some implementations, multiple user devices 110 may be associated with a same user profile, and the context storage component 175 may store context data corresponding to some or all of the user devices 110. Thus, one user device 110 can determine a possible destination of a media comment based on context data received from a second user device 110 associated with the same user profile. In some implementations, other data such as image data may be used to identify what a user is watching. In some implementations, the user profile data may include a list of the user's recently and/or frequently requested media content (e.g., favorite shows, stations, apps, etc.).

In some implementations, the VUI skill component 190a may leverage dialog processing to provide a multi-turn dialog experience to the user. Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The system(s) 100 may include a dialog manager component 172 that manages and/or tracks a dialog between a user and a device. The dialog manager component 172 (not shown in FIG. 1 but described further below with reference to FIG. 10) may, in various implementations, be included as a component or subcomponent of the language processing components 192, the VUI skill component 190a, the language output components 193, and/or exist as a standalone component such as a skill component 190. As used herein, a "dialog" may refer to data transmissions (such as relating to multiple user inputs and system 100 outputs) between the system 100 and a user (e.g., through device(s) 110) that all relate to a single "conversation" between the system and the user that may have originated with a single user input initiating the dialog. Thus, the data transmissions of a dialog may be associated with a same dialog identifier, which may be used by components of the overall system 100 to track information across the dialog. Subsequent user inputs of the same dialog may or may not start with speaking of a wakeword. Each natural language input of a dialog may be associated with a different natural language input identifier such that multiple natural language input identifiers may be associated with a single dialog identifier. Further, other non-natural language inputs (e.g., image data, gestures, button presses, etc.) may relate to a particular dialog depending on the context of the inputs. For example, a user may open a dialog with the system 100 to request a food delivery in a spoken utterance and the system may respond by displaying images of food available for order and the user may speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the dialog and the data associated therewith may be associated with the dialog identifier of the dialog.

The dialog manager component 172 may associate a dialog session identifier with the dialog upon identifying that the user is engaging in a dialog with the user. The dialog manager component 172 may track a user input and the corresponding system generated response to the user input as a turn. The dialog session identifier may correspond to multiple turns of user input and corresponding system generated response. The dialog manager component 172 may transmit data identified by the dialog session identifier directly to the orchestrator component 130 or other component. Depending on system configuration the dialog manager 172 may determine the appropriate system generated response to give to a particular utterance or user input of a turn. Or creation of the system generated response may be managed by another component of the system (e.g., the language output component 193, NLG 179, orchestrator 130, etc.) while the dialog manager 172 selects the appropriate responses. Alternatively, another component of the system component(s) 120 may select responses using techniques discussed herein. The text of a system generated response may be sent to a TTS component 180 for creation of audio data corresponding to the response. The audio data may then be sent to a user device (e.g., device 110) for ultimate output to the user. Alternatively (or in addition) a dialog response may be returned in text or some other form.

The dialog manager 172 may receive the ASR hypothesis/hypotheses (i.e., text data) and make a semantic interpretation of the phrase(s) or statement(s) represented therein.

That is, the dialog manager 172 determines one or more meanings associated with the phrase(s) or statement(s) represented in the text data based on words represented in the text data. The dialog manager 172 determines a goal corresponding to an action that a user desires be performed as well as pieces of the text data that allow a device (e.g., the device 110, the system component(s) 120, a skill component 190, a skill system component(s) 125, etc.) to execute the intent. If, for example, the text data corresponds to "what is the weather," the dialog manager 172 may determine that that the system component(s) 120 is to output weather information associated with a geographic location of the device 110. In another example, if the text data corresponds to "turn off the lights," the dialog manager 172 may determine that the system component(s) 120 is to turn off lights associated with the device(s) 110 or the user(s) 5.

The dialog manager 172 may send the results data to one or more skill component(s) 190. If the results data includes a single hypothesis, the orchestrator component 130 may send the results data to the skill component(s) 190 associated with the hypothesis. If the results data includes an N-best list of hypotheses, the orchestrator component 130 may send the top scoring hypothesis to a skill component(s) 190 associated with the top scoring hypothesis.

The system component 120 includes a language output component 193. The language output component 193 includes a natural language generation (NLG) component 179 and a text-to-speech (TTS) component 180. The NLG component 179 can generate text for purposes of TTS output to a user. For example the NLG component 179 may generate text corresponding to instructions corresponding to a particular action for the user to perform. The NLG component 179 may generate appropriate text for various outputs as described herein. The NLG component 179 may include one or more trained models configured to output text appropriate for a particular input. The text output by the NLG component 179 may become input for the TTS component 180 (e.g., output text data 1115 discussed below). Alternatively or in addition, the TTS component 180 may receive text data from a skill component 190 or other system component for output.

The NLG component 179 may include a trained model. The NLG component 179 generates text data 1115 from dialog data received by the dialog manager 172 such that the output text data 1115 has a natural feel and, in some embodiments, includes words and/or phrases specifically formatted for a requesting individual. The NLG may use templates to formulate responses. And/or the NLG system may include models trained from the various templates for forming the output text data 1115. For example, the NLG system may analyze transcripts of local news programs, television shows, sporting events, or any other media program to obtain common components of a relevant language and/or region. As one illustrative example, the NLG system may analyze a transcription of a regional sports program to determine commonly used words or phrases for describing scores or other sporting news for a particular region. The NLG may further receive, as inputs, a dialog history, an indicator of a level of formality, and/or a command history or other user history such as the dialog history.

The NLG system may generate dialog data based on one or more response templates. Further continuing the example above, the NLG system may select a template in response to the question, "What is the weather currently like?" of the form: "The weather currently is $weather_information$." The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG system may then be generated using the text-to-speech component 180.

The TTS component 180 may generate audio data (e.g., synthesized speech) from text data using one or more different methods. Text data input to the TTS component 180 may come from a skill component 190, the orchestrator component 130, or another component of the system. In one method of synthesis called unit selection, the TTS component 180 matches text data against a database of recorded speech. The TTS component 180 selects matching units of recorded speech and concatenates the units together to form audio data. In another method of synthesis called parametric synthesis, the TTS component 180 varies parameters such as frequency, volume, and noise to create audio data including an artificial speech waveform. Parametric synthesis uses a computerized voice generator, sometimes called a vocoder.

The system 100 (either on device 110, system component 120, or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 170 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a device 110, the user profile (associated with the presented login information) may be updated to include information about the device 110, for example with an indication that the device is currently in use. Each user profile may include identifiers of skills that the user has enabled. When a user enables a skill, the user is providing the system component 120 with permission to allow the skill to execute with respect to the user's natural language user inputs. If a user does not enable a skill, the system component 120 may not invoke the skill to execute with respect to the user's natural language user inputs.

The profile storage 170 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 170 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Although the components of FIG. 1 may be illustrated as part of system component(s) 120, device 110, or otherwise, the components may be arranged in other device(s) (such as in device 110 if illustrated in system component(s) 120 or vice-versa, or in other device(s) altogether) without departing from the disclosure. For example, in at least some embodiments, the system component 120 may receive the audio data 128 from the device 110, to recognize speech corresponding to a spoken input in the received audio data 128, and to perform functions in response to the recognized speech. In at least some embodiments, these functions involve sending directives (e.g., commands), from the system component 120 to the device 110 (and/or other devices 110) to cause the device 110 to perform an action, such as output an audible response to the spoken input via a loudspeaker(s), and/or control secondary devices in the environment by sending a control command to the secondary devices.

Thus, when the device 110 is able to communicate with the system component 120 over the network(s) 199, some or all of the functions capable of being performed by the system component 120 may be performed by sending one or more directives over the network(s) 199 to the device 110, which, in turn, may process the directive(s) and perform one or more corresponding actions. For example, the system component 120, using a remote directive that is included in response data (e.g., a remote response), may instruct the device 110 to output an audible response (e.g., using TTS processing performed by an on-device TTS component 180) to a user's question via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It is to be appreciated that the system component 120 may be configured to provide other functions in addition to those discussed herein, such as, without limitation, providing step-by-step directions for navigating from an origin location to a destination location, conducting an electronic commerce transaction on behalf of the user 5 as part of a shopping function, establishing a communication session (e.g., a video call) between the user 5 and another user, and so on.

In at least some embodiments, the on-device language processing components may not have the same capabilities as the language processing components of the system component 120. For example, the on-device language processing components may be configured to handle only a subset of the natural language user inputs that may be handled by the system component 120. For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system component 120. If the device 110 attempts to process a natural language user input for which the on-device language processing components are not necessarily best suited, the language processing results determined by the device 110 may indicate a low confidence or other metric indicating that the processing by the device 110 may not be as accurate as the processing done by the system component 120.

FIGS. 3 through 6 include signal diagrams illustration example operations of the system 100 related to streaming media and sending media comments. The virtual assistant system 100 may provide a natural language interface through which the user 5 may provide inputs to, and receive outputs from, the user device 110. The operations may be performed using the various components of the system, which may reside and/or execute on the user device 110, one or more system components 120, and/or one or more skill support system components 125. For example, the components may include the orchestrator component 130, the VUI skill component 190a, the context storage component 175, the entity resolution component 165, the media comment storage component 178, the content inspection component 185, and the media skill component 190b, as shown in FIGS. 3 through 6.

Figure 3:
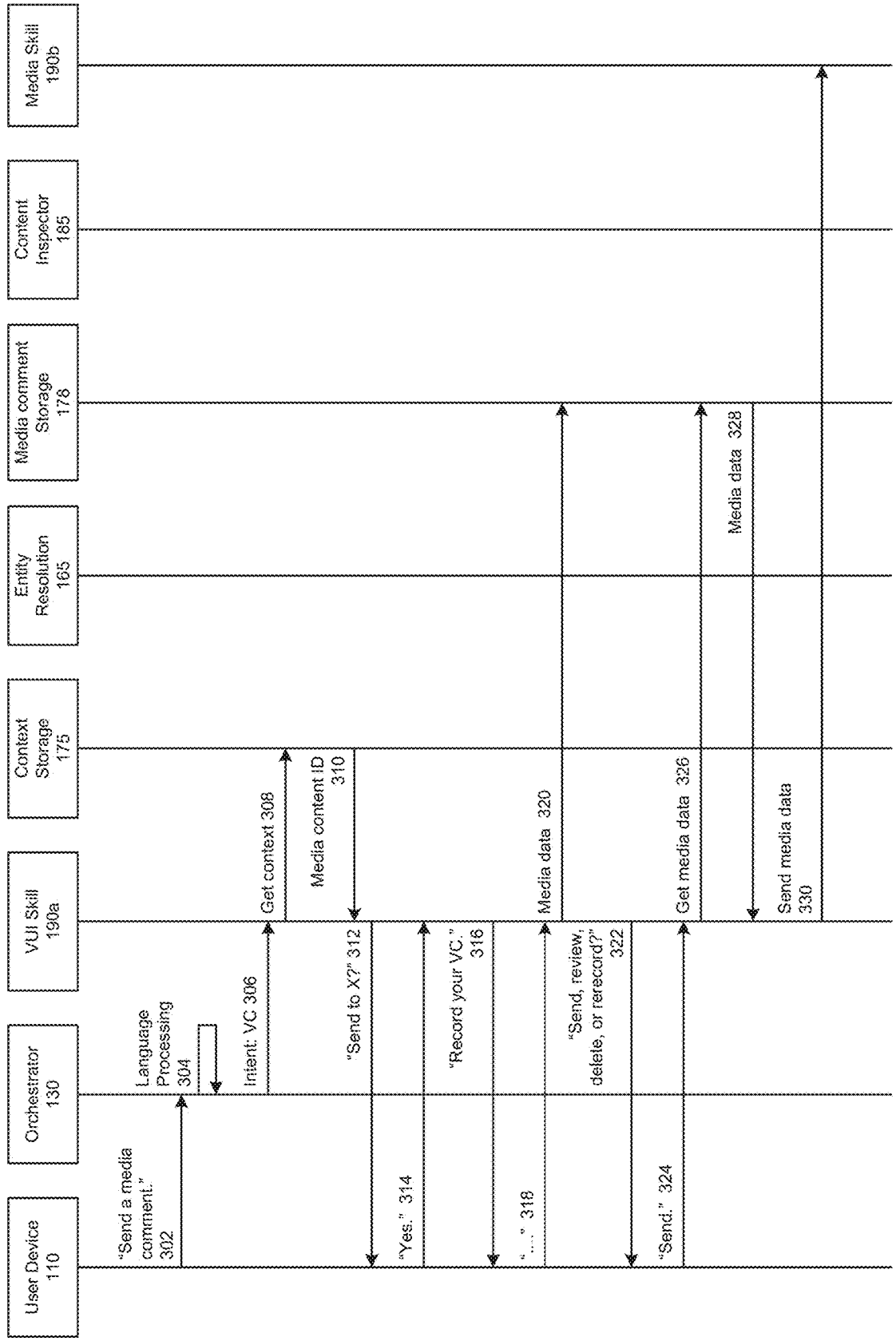
FIG. 3 is a signal flow diagram illustrating example operations for sending media comment data using a natural language interface, according to embodiments of the present disclosure.

FIG. 3 is a signal flow diagram illustrating example operations for sending a media comment using a natural language interface, according to embodiments of the present disclosure. The operations may begin with the user speaking to the system 100, "Send a media comment." The user device 110 may capture the audio, generate audio data, and send (302) the audio data to the orchestrator component 130. If the system 100 has been playing back media content from the user device 110, the system 100 may pause the media content playback or lower the volume upon detecting the user's speech (and/or a wakeword in the user's speech) so as not to interrupt the user. The orchestrator component 130 may coordinate language processing (304); for example, using the language processing components 192 described herein. The language processing may determine an intent corresponding to the utterance, in this case, the intent may be <VoiceComment>. The orchestrator component 130 may send (306) the intent data to the VUI skill component 190a.

The system 100 may determine an entity corresponding to the <VoiceComment> intent; that is, a destination for the media comment. The entity resolution may be performed based on the user's speech and/or based on context data. In the operations shown in FIG. 3, the VUI skill component 190a may request (308) context data from the context storage component 175. The context storage component 175 may store, among other data, media content identifiers corresponding to media content being sent to and/or output by the user device 110. For example, if the user previously requested media content to be provided by the media skill component 190b, the media content may correspond to a media content identifier. When the user device 110 outputs the media content, it may store the media content identifier in the context storage component 175. Thus, the context storage component may return (310) the media content identifier corresponding to the audio currently (or recently) output by the user device 110.

The VUI skill component 190a may use the media content identifier to identify a skill component corresponding to the desired destination of the media comment. The VUI skill component 190a may identify the destination based on a portion of the media content identifier (e.g., a prefix or suffix or the like uniquely corresponding to a particular skill component 190). The VUI skill component 190a may identify the destination using a database or lookup table to retrieve a skill identifier corresponding to the media content identifier. In some implementations, the VUI skill component 190a may request (312) the user to confirm the destination: "Send media comment to the Radio Show?" The user may (314) indicate that the destination is correct; for example, by saying "yes," selecting yes from a touchscreen menu, or by other means of input. The VUI skill component 190a may then indicate (316) to the user to "Record your media comment." The user may utter their media comment, and the user device 110 may send (318) the corresponding media data to the VUI skill component 190a. The VUI skill component 190a may store (320) the media data in the media comment storage component 178 unless/until the user confirms that the media comment is to be sent to the destination.

In some implementations, the VUI skill component 190a may provide the user with options for handling the recorded media. The VUI skill component 190a may cause the user device 110 to output (322) synthesized speech asking the user whether they would like to review their media comment, delete it, rerecord it, or send it to the destination. The user may (324) respond to the question by confirming their wish to send the media comment; for example, by saying "Send," selecting "Send" from a touchscreen menu, or by other means of input. The VUI skill component 190a may then request (326) the media comment data from the media comment storage component 178. The media comment storage component 178 may return (328) the media data. The VUI skill component 190a may send (330) the media data representing media comment to the media skill component 190b. In some implementations, the system 100 may send a notification to the content creator (e.g., via the media skill component 190b or to another device associated with the creator) that the media comment is available and ready for review/broadcast. The media content creator may review the media data and, if so desired, share the media comment in the show by including it in future media content. For example, the media skill component 190b may store the media comment data in a storage associated with the media skill component 190b. The system 100 may provide an interface to the content creator to facilitate adding the media comment data to media content produced by the content creator.

In some implementations, the VUI skill component 190a may send the media comment data to a different skill component; for example, one corresponding to the creator of the media content. In some cases, the media skill component 190b may host media content from multiple content creators. Thus, upon receiving confirmation to send the media content to the content creator, the VUI skill component 190a may identify a skill component 190 (and/or other device/system) associated with media content (which may be different from the media skill component 190b). The VUI skill component 190a may send the media comment data to the skill component 190 associated with media content and/or send a notification to that skill component 190 indicating that a new media comment is available. The content creator may then retrieve and use the media comment data.

Figure 4:
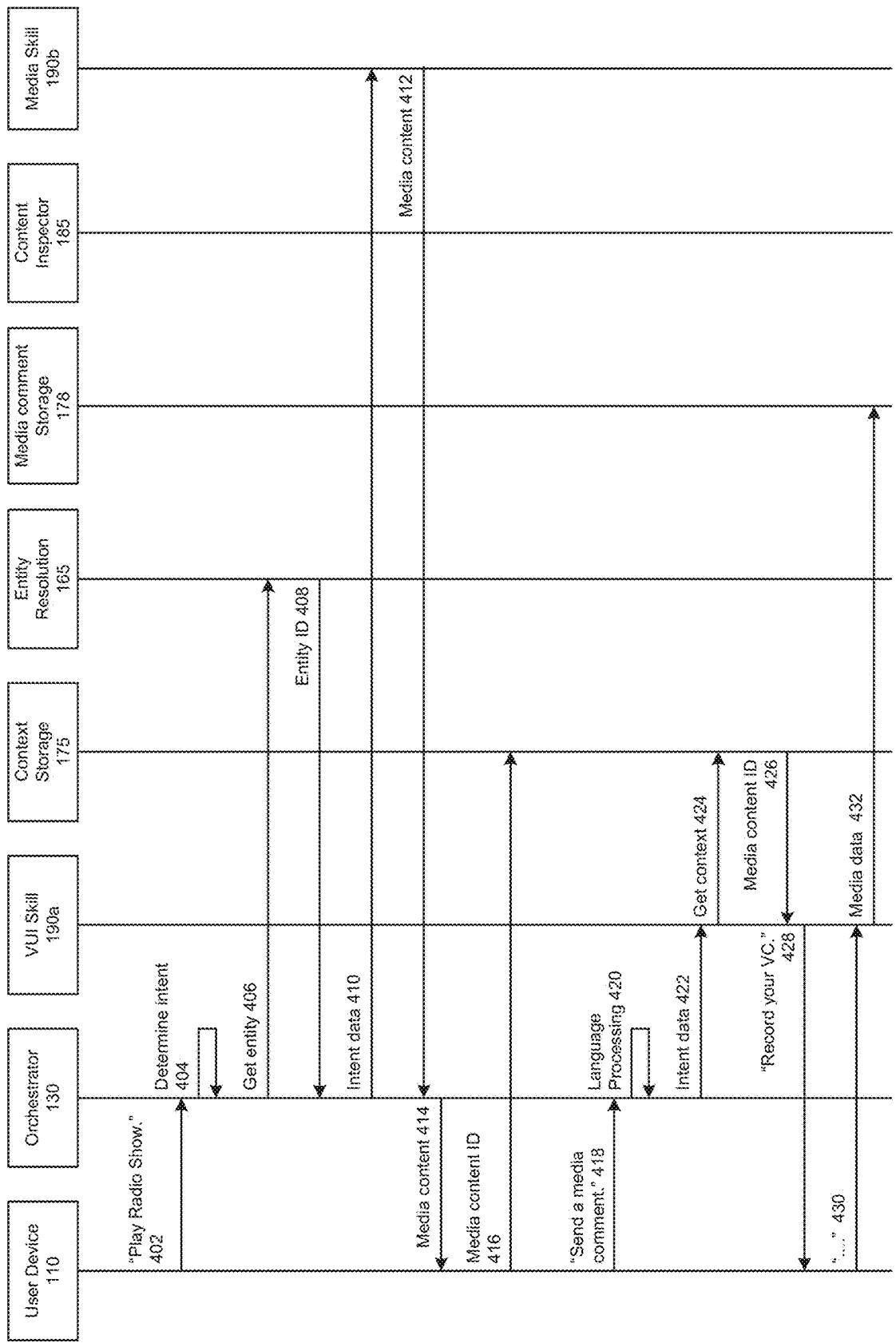
FIG. 4 is a signal flow diagram illustrating example operations for requesting media content and sending media comment data to the media content creator, according to embodiments of the present disclosure.

As described above, a user may send a media comment in response to an invitation made in a piece of media content (e.g., a podcast, radio show, etc.). FIG. 4 is a signal flow diagram illustrating example operations for requesting media content and sending a media comment to the media content creator, according to embodiments of the present disclosure.

The user may request media content: "Play Radio Show." The user device 110 may capture the audio and send (402) corresponding audio data to the orchestrator component 130. The orchestrator component 130 may coordinate language processing (404); for example, using the language processing components 192 described herein. The language processing may determine an intent corresponding to the utterance, in this case, the intent may be <RadioShow>. The language processing may further determine an entity (e.g., determine which particular media content and/or media skill the user wishes to invoke). The orchestrator component 130 may send (406) ASR data associated with slot text from the user input to the entity resolution component 165. The entity resolution component 165 may determine an entity and return (408) an entity identifier that may allow the orchestrator component 130 to invoke the appropriate media skill component 190b to request the desired media content. The orchestrator component 130 may send (410) the intent data including the entity identifier to the media skill component 190b. The media skill component 190b may return (412) the requested media content, which the orchestrator component 130 may send (414) to the user device 110 for output. When the user device 110 outputs the media content, the user device 110 may send (416) a media content identifier of the media content to the context storage component 175. For example, the media content may include metadata such as a media content identifier unique to the media content, and/or a skill identifier unique to the media skill component 190b. Additionally or alternatively, the context storage component 175 may query the user device 110 for the current context (e.g., what media content the user device 110 is currently outputting) upon a request from the media skill component 190b and/or other skill component 190. The media content identifier may subsequently be used for entity resolution; for example, should the user request to send a media comment during (or shortly after) output of the media content.

The operations 418 through 426 (including retrieving the media content identifier from the context storage component 175 to determine a destination for the media comment data) are similar to the operations 302 through 310, and the operations 428 through 432 are similar to the operations 316 through 320.

Figure 5:
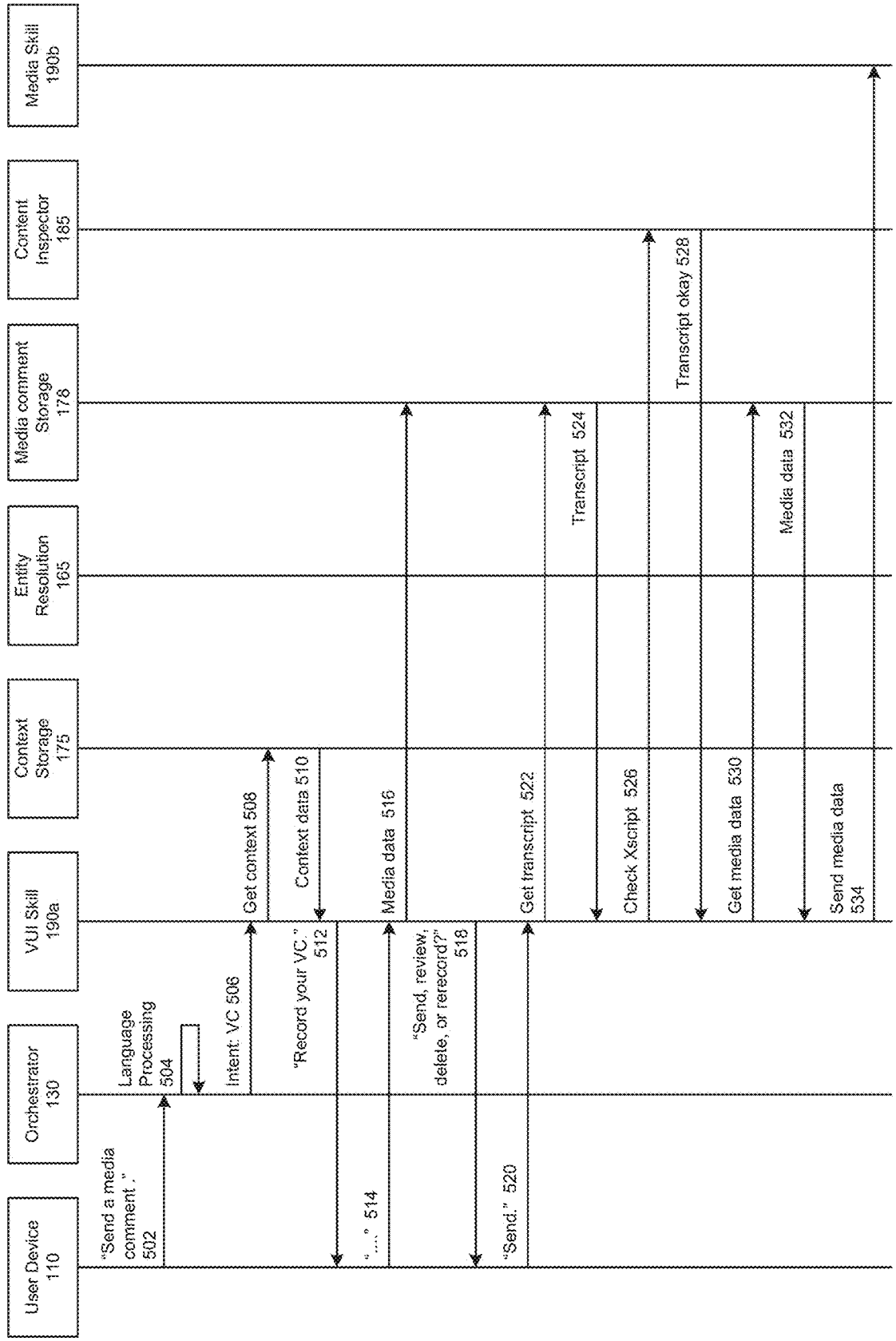
FIG. 5 is a signal flow diagram illustrating example operations for checking media comment data for content violations prior to sending to a media content creator, according to embodiments of the present disclosure.

In some implementations, media comments may be screened to ensure they are appropriate for releasing publicly. FIG. 5 is a signal flow diagram illustrating example operations for checking a media comment for content violations prior to sending to a media content creator, according to embodiments of the present disclosure. The operations 502 through 510 (including retrieving the media content identifier from the context storage component 175 to determine a destination for the media comment data) are similar to the operations 302 through 310, and the operations 512 through 516 are similar to the operations 316 through 320.

The VUI skill component 190a may cause (518) the user device 110 to output synthesized speech representing options for handling the recorded media comment: "Would you like to send, review, delete, or re-record your media comment?" In the example operations shown in FIG. 5, the user may confirm (520) that they wish to send the media comment to the destination.

In some implementations, the system 100 may check the media comment data for prohibited content. For example, the VUI skill component 190a may request (522) a transcript of the media comment. The transcript may be generated by, for example, the ASR component 150 and stored in the media comment storage component 178 with, or as part of, the media comment data. The media comment storage component 178 may return (524) the transcript to the VUI skill component 190*a*. The VUI skill component 190*a* may send (526) the transcript to the content inspection component 185 and request that it be checked. In the example operations shown in FIG. 5, the content inspection component 185 determines that the media comment transcript contains no prohibited content, and returns (528) and indication to that effect to the VUI skill component 190*a*. The VUI skill component 190*a*, having received user confirmation to send the media comment and indication that it contains no prohibited content, may request (530) the media data from the media comment storage component 178. The media comment storage component 178 may send (532) the media data to the VUI skill component 190*a*, which may then send (534) the media data to the media skill component 190*b*. As in the previous examples, the system 100 may send a notification to the content creator (e.g., via the media skill component 190*b* or to another device associated with the creator) that the media comment is available and ready for review/broadcast. The media content creator may review the media data and, if so desired, share the media comment in the show by including it in future media content.

Figure 6:
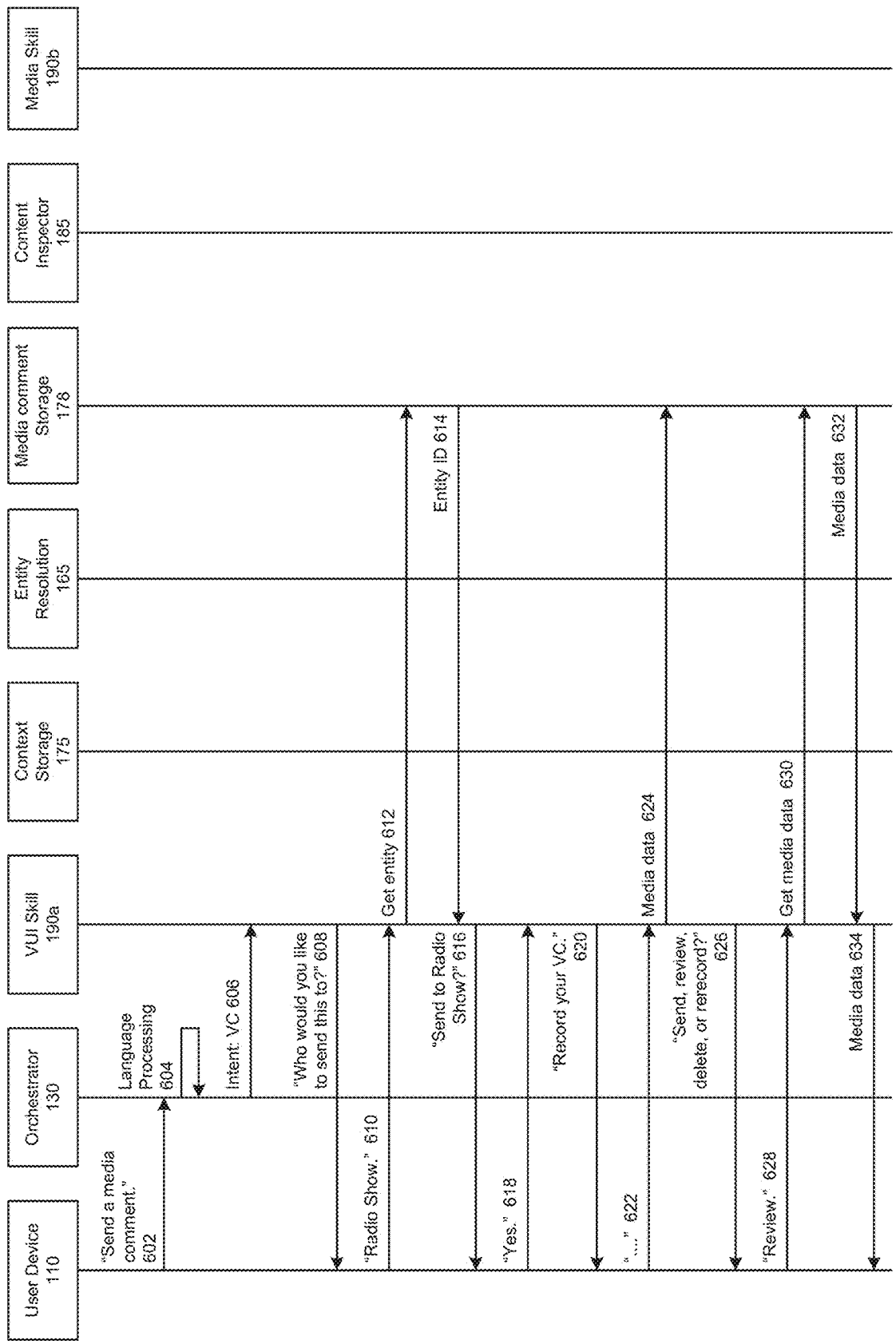
FIG. 6 is a signal flow diagram illustrating example operations for user review of media comment data prior to sending to a media content creator, according to embodiments of the present disclosure.

In some implementations, the system 100 may provide the user with options to review and/or edit their media comment. FIG. 6 is a signal flow diagram illustrating example operations for user review of a media comment prior to sending to a media content creator, according to embodiments of the present disclosure. The operations may begin with the user speaking to the system 100, "Send a media comment." The user device 110 may capture the audio, generate audio data, and send (602) the audio data to the orchestrator component 130. The orchestrator component 130 may coordinate language processing (604); for example, using the language processing components 192 described herein. The language processing may determine an intent corresponding to the utterance, in this case, the intent may be <VoiceComment>. The orchestrator component 130 may send (606) the intent data to the VUI skill component 190*a*. The VUI skill component 190*a* may determine that the user input did not specify a destination for the media comment. Thus, the VUI skill component 190*a* may send (608) a request to the user to specify the destination: "Who would you like to send this go?" The user may respond by naming "The Radio Show." The user device 110 may capture the audio, generate audio data, and send (610) the audio data to the orchestrator component 130. The orchestrator component 130 may send (612) ASR data associated with slot text from the user input to the entity resolution component 165. The entity resolution component 165 may determine an entity and return (614) an entity identifier that may allow the VUI skill component 190*a* to send the media comment data to the appropriate media skill component 190*b*.

The VUI skill component 190*a* may use the media content identifier to identify a skill component corresponding to the desired destination of the media comment. In some implementations, the VUI skill component 190*a* may request (616) the user to confirm the destination: "Send media comment to the Radio Show?" The user may (618) indicate that the destination is correct; for example, by saying "yes," selecting yes from a touchscreen menu, or by other means of input. The VUI skill component 190*a* may then indicate (620) to the user to "Record your media comment." The user may utter their media comment, and the user device 110 may send (622) the corresponding media data to the VUI skill component 190*a*. The VUI skill component 190*a* may store (624) the media data in the media comment storage component 178 unless/until the user confirms that the media comment is to be sent to the destination.

In some implementations, the VUI skill component 190*a* may provide the user with options for handling the recorded media. The VUI skill component 190*a* may cause the user device 110 to output (626) synthesized speech asking the user whether they would like to review their media comment, delete it, rerecord it, or send it to the destination. The user may (628) respond to the question by requesting to review the media comment; for example, by saying "Review," selecting "Review" from a touchscreen menu, or by other means of input. The VUI skill component 190*a* may then request (630) the media comment data from the media comment storage component 178. The media comment storage component 178 may return (632) the media data. The VUI skill component 190*a* may send (634) the media data representing media comment to the user device 110 for output to the user. The system 100 may continue the dialog by handling user commands to delete, re-record, send, or otherwise act upon the media comment as described in the other examples.

Figure 7:
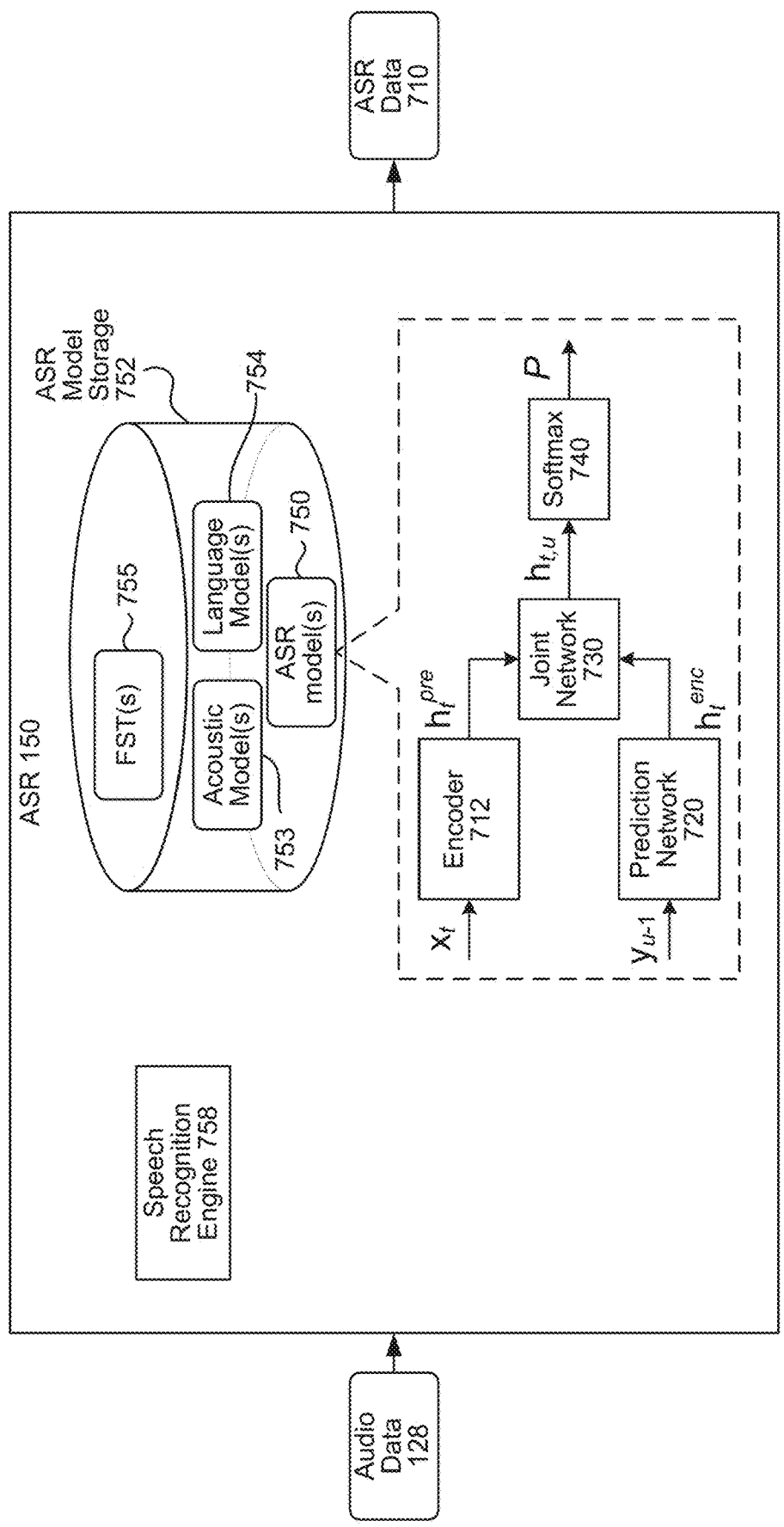
FIG. 7 is a conceptual diagram of an ASR component, according to embodiments of the present disclosure.

FIG. 7 is a conceptual diagram of an ASR component 150, according to embodiments of the present disclosure. The ASR component 150 may interpret a spoken natural language input based on the similarity between the spoken natural language input and pre-established language models 754 stored in an ASR model storage 752. For example, the ASR component 150 may compare the audio data with models for sounds (e.g., subword units or phonemes) and sequences of sounds to identify words that match the sequence of sounds spoken in the natural language input. Alternatively, the ASR component 150 may use a finite state transducer (FST) 755 to implement the language model functions.

When the ASR component 150 generates more than one ASR hypothesis for a single spoken natural language input, each ASR hypothesis may be assigned a score (e.g., probability score, confidence score, etc.) representing a likelihood that the corresponding ASR hypothesis matches the spoken natural language input (e.g., representing a likelihood that a particular set of words matches those spoken in the natural language input). The score may be based on a number of factors including, for example, the similarity of the sound in the spoken natural language input to models for language sounds (e.g., an acoustic model 753 stored in the ASR model storage 752), and the likelihood that a particular word, which matches the sounds, would be included in the sentence at the specific location (e.g., using a language or grammar model 754). Based on the considered factors and the assigned confidence score, the ASR component 150 may output an ASR hypothesis that most likely matches the spoken natural language input, or may output multiple ASR hypotheses in the form of a lattice or an N-best list, with each ASR hypothesis corresponding to a respective score.

The ASR component 150 may include a speech recognition engine 758. The ASR component 150 receives audio data 128 (for example, received from a local device 110 having processed audio detected by a microphone by an acoustic front end (AFE) or other component). The speech recognition engine 758 compares the audio data 128 with acoustic models 753, language models 754, FST(s) 755, and/or other data models and information for recognizing the speech conveyed in the audio data. The audio data 128 may be audio data that has been digitized (for example by an AFE) into frames representing time intervals for which the AFE determines a number of values, called features, representing the qualities of the audio data, along with a set of those values, called a feature vector, representing the features/qualities of the audio data within the frame. In at least some embodiments, audio frames may be 10 ms each. Many different features may be determined, as known in the art, and each feature may represent some quality of the audio that may be useful for ASR processing. A number of approaches may be used by an AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art. In some cases, feature vectors of the audio data may arrive encoded, in which case they may be decoded by the speech recognition engine 758 and/or prior to processing by the speech recognition engine 758.

In some implementations, the ASR component 150 may process the audio data 128 using the ASR model 750. The ASR model 750 may be, for example, a recurrent neural network such as an RNN-T. An example RNN-T architecture is illustrated in FIG. 7. The ASR model 750 may predict a probability (y|x) of labels $y=(y_1, \ldots y_u)$ given acoustic features $x=(x_1, \ldots, x_t)$. During inference, the ASR model 750 can generate an N-best list using, for example, a beam search decoding algorithm. The ASR model 750 may include an encoder 712, a prediction network 720, a joint network 730, and a softmax 740. The encoder 712 may be similar or analogous to an acoustic model (e.g., similar to the acoustic model 753 described below), and may process a sequence of acoustic input features to generate encoded hidden representations. The prediction network 720 may be similar or analogous to a language model (e.g., similar to the language model 754 described below), and may process the previous output label predictions, and map them to corresponding hidden representations. The joint network 730 may be, for example, a feed forward neural network (NN) that may process hidden representations from both the encoder 712 and prediction network 720, and predict output label probabilities. The softmax 740 may be a function implemented (e.g., as a layer of the joint network 730) to normalize the predicted output probabilities.

The speech recognition engine 758 may process the audio data 128 with reference to information stored in the ASR model storage 752. Feature vectors of the audio data 128 may arrive at the system component 120 encoded, in which case they may be decoded prior to processing by the speech recognition engine 758.

The speech recognition engine 758 attempts to match received feature vectors to language acoustic units (e.g., phonemes) and words as known in the stored acoustic models 753, language models 754, and FST(s) 755. For example, audio data 128 may be processed by one or more acoustic model(s) 753 to determine acoustic unit data. The acoustic unit data may include indicators of acoustic units detected in the audio data 128 by the ASR component 150. For example, acoustic units can consist of one or more of phonemes, diaphonemes, tonemes, phones, diphones, triphones, or the like. The acoustic unit data can be represented using one or a series of symbols from a phonetic alphabet such as the X-SAMPA, the International Phonetic Alphabet, or Initial Teaching Alphabet (ITA) phonetic alphabets. In some implementations a phoneme representation of the audio data can be analyzed using an n-gram based tokenizer. An entity, or a slot representing one or more entities, can be represented by a series of n-grams.

The acoustic unit data may be processed using the language model 754 (and/or using FST 755) to determine ASR output data 710. The ASR output data 710 can include one or more hypotheses. One or more of the hypotheses represented in the ASR output data 710 may then be sent to further components (such as the NLU component 160) for further processing as discussed herein. The ASR output data 710 may include representations of text of an utterance, such as words, subword units, or the like.

The speech recognition engine 758 computes scores for the feature vectors based on acoustic information and language information. The acoustic information (such as identifiers for acoustic units and/or corresponding scores) is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR component 150 will output ASR hypotheses that make sense grammatically. The specific models used may be general models or may be models corresponding to a particular domain, such as music, banking, etc.

The speech recognition engine 758 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Further techniques, such as using FSTs, may also be used.

The speech recognition engine 758 may use the acoustic model(s) 753 to attempt to match received audio feature vectors to words or subword acoustic units. An acoustic unit may be a senone, phoneme, phoneme in context, syllable, part of a syllable, syllable in context, or any other such portion of a word. The speech recognition engine 758 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR component 150 outputs ASR hypotheses that make sense grammatically.

The speech recognition engine 758 may use a number of techniques to match feature vectors to phonemes or other acoustic units, such as diphones, triphones, etc. One common technique is using Hidden Markov Models (HMMs). HMMs are used to determine probabilities that feature vectors may match phonemes. Using HMMs, a number of states are presented, in which the states together represent a potential phoneme (or other acoustic unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the HMM and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the speech recognition engine 758, the state may change or stay the same, based on the processing of the new feature vectors. A Viterbi algorithm may be used to find the most likely sequence of states based on the processed feature vectors.

The probable phonemes and related states/state transitions, for example HMM states, may be formed into paths traversing a lattice of potential phonemes. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. This process of determining scores based on the feature vectors may be called acoustic modeling. When combining scores as part of the ASR processing, scores may be multiplied together (or combined in other ways) to reach a desired combined score or probabilities may be converted to the log domain and added to assist processing.

The speech recognition engine 758 may also compute scores of branches of the paths based on language models or grammars. Language modeling involves determining scores for what words are likely to be used together to form coherent words and sentences. Application of a language model may improve the likelihood that the ASR component 150 correctly interprets the speech contained in the audio data. For example, for an input audio sounding like "hello," acoustic model processing that returns the potential phoneme paths of "H E L O", "H A L O", and "Y E L O" may be adjusted by a language model to adjust the recognition scores of "H E L O" (interpreted as the word "hello"), "H A L O" (interpreted as the word "halo"), and "Y E L O" (interpreted as the word "yellow") based on the language context of each word within the spoken utterance.

Figure 8:
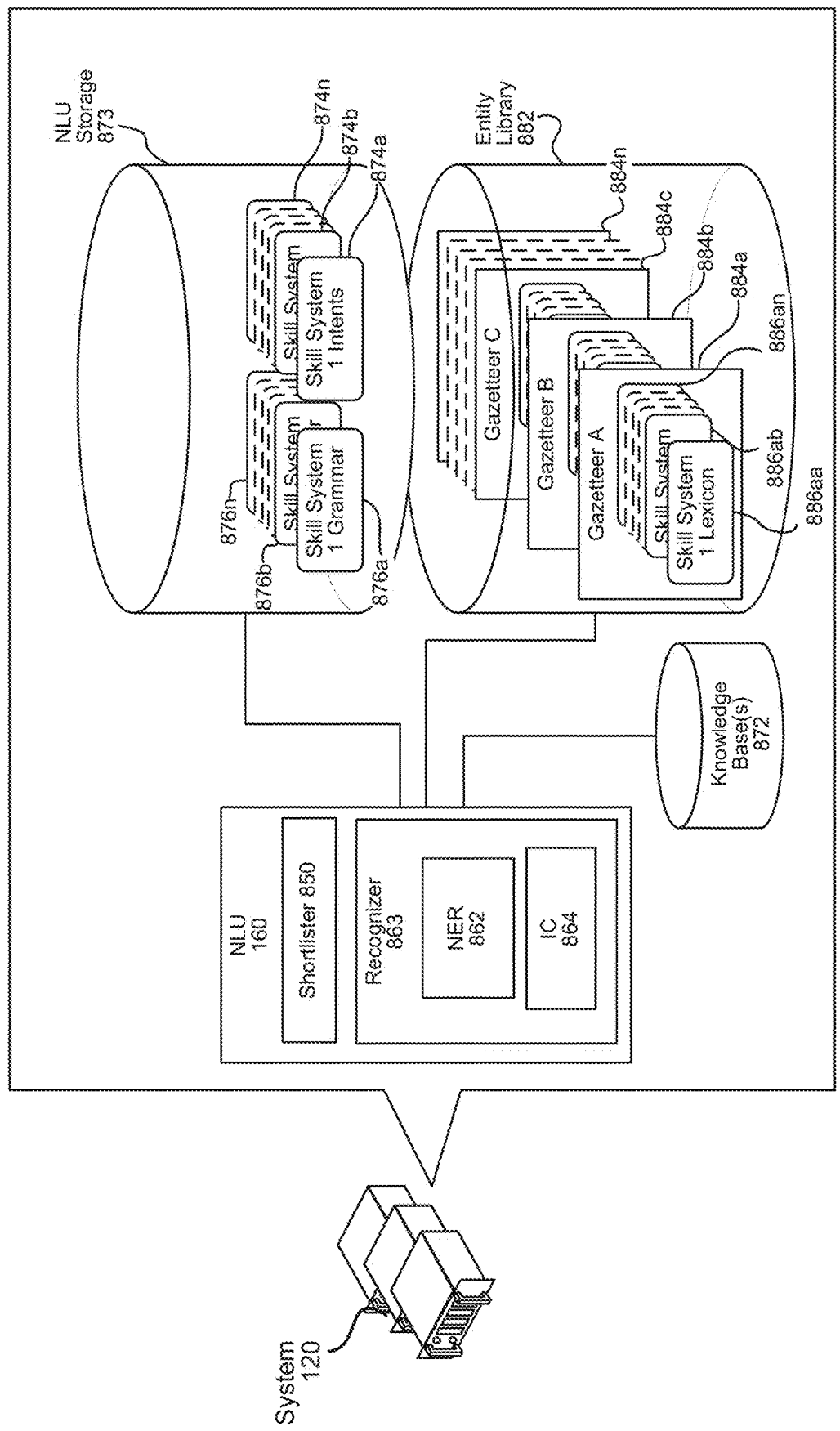
FIG. 8 is a conceptual diagram of how natural language processing is performed, according to embodiments of the present disclosure.
Figure 9:
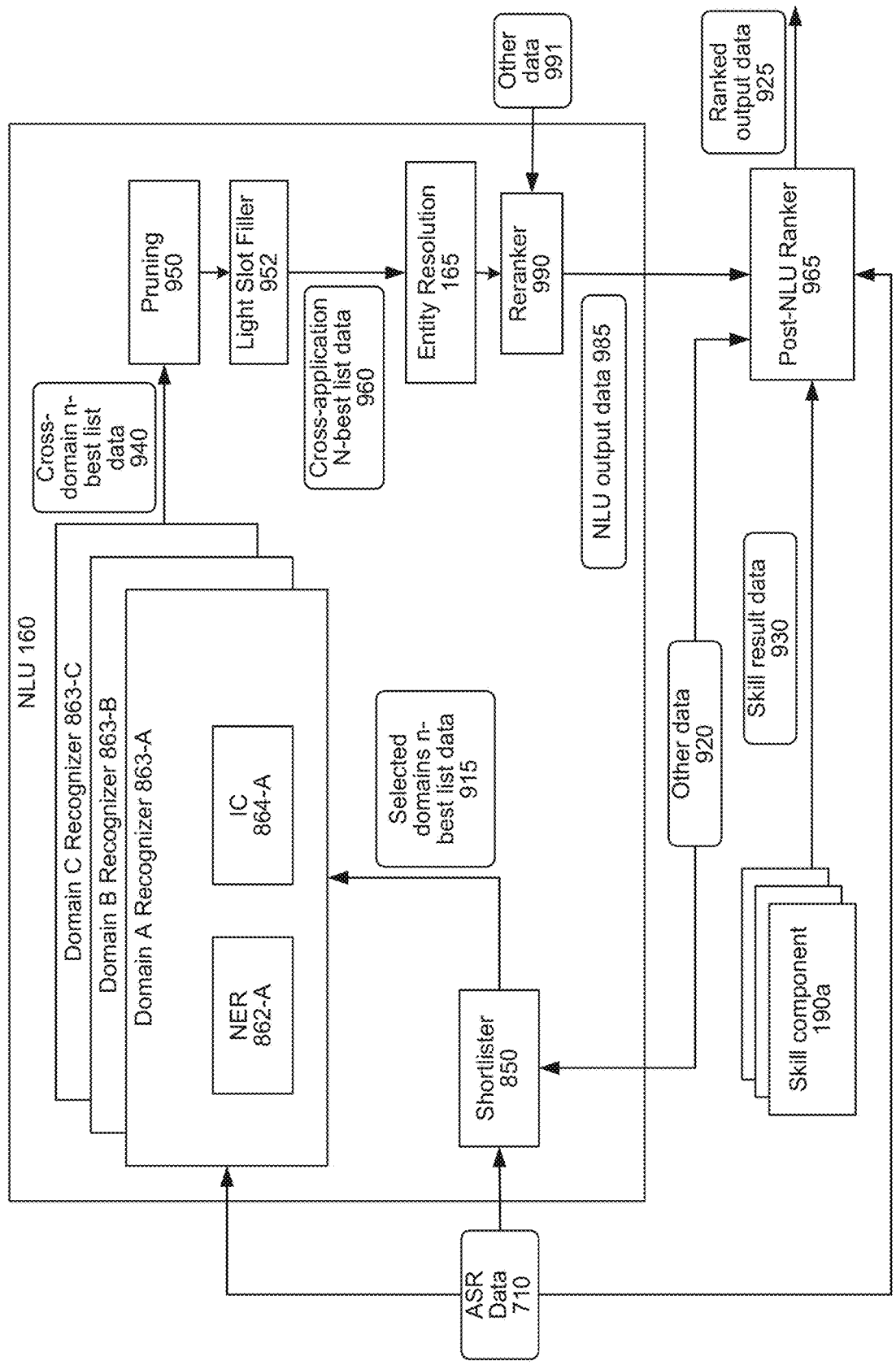
FIG. 9 is a conceptual diagram of how natural language processing is performed, according to embodiments of the present disclosure.

FIGS. 8 and 9 illustrates how the NLU component 160 may perform NLU processing. FIG. 8 is a conceptual diagram of how natural language processing is performed, according to embodiments of the present disclosure. And FIG. 9 is a conceptual diagram of how natural language processing is performed, according to embodiments of the present disclosure.

FIG. 8 illustrates how NLU processing is performed on text data. The NLU component 160 may process text data including several ASR hypotheses of a single user input. For example, if the ASR component 150 outputs text data including an n-best list of ASR hypotheses, the NLU component 160 may process the text data with respect to all (or a portion of) the ASR hypotheses represented therein.

The NLU component 160 may annotate text data by parsing and/or tagging the text data. For example, for the text data "tell me the weather for Seattle," the NLU component 160 may tag "tell me the weather for Seattle" as an <OutputWeather> intent as well as separately tag "Seattle" as a location for the weather information.

The NLU component 160 may include a shortlister component 850. The shortlister component 850 selects skills that may execute with respect to ASR output data 710 input to the NLU component 160 (e.g., applications that may execute with respect to the user input). The ASR output data 710 (which may also be referred to as ASR output data 710) may include representations of text of an utterance, such as words, subword units, or the like. The shortlister component 850 thus limits downstream, more resource intensive NLU processes to being performed with respect to skills that may execute with respect to the user input.

Without a shortlister component 850, the NLU component 160 may process ASR output data 710 input thereto with respect to every skill of the system, either in parallel, in series, or using some combination thereof. By implementing a shortlister component 850, the NLU component 160 may process ASR output data 710 with respect to only the skills that may execute with respect to the user input. This reduces total compute power and latency attributed to NLU processing.

The shortlister component 850 may include one or more trained models. The model(s) may be trained to recognize various forms of user inputs that may be received by the system component(s) 120. For example, during a training period skill system component(s) 125 associated with a skill may provide the system component(s) 120 with training text data representing sample user inputs that may be provided by a user to invoke the skill. For example, for a ride sharing skill, a skill system component(s) 125 associated with the ride sharing skill may provide the system component(s) 120 with training text data including text corresponding to "get me a cab to [location]," "get me a ride to [location]," "book me a cab to [location]," "book me a ride to [location]," etc. The one or more trained models that will be used by the shortlister component 850 may be trained, using the training text data representing sample user inputs, to determine other potentially related user input structures that users may try to use to invoke the particular skill. During training, the system component(s) 120 may solicit the skill system component(s) 125 associated with the skill regarding whether the determined other user input structures are permissible, from the perspective of the skill system component(s) 125, to be used to invoke the skill. The alternate user input structures may be derived by one or more trained models during model training and/or may be based on user input structures provided by different skills. The skill system component(s) 125 associated with a particular skill may also provide the system component(s) 120 with training text data indicating grammar and annotations. The system component(s) 120 may use the training text data representing the sample user inputs, the determined related user input(s), the grammar, and the annotations to train a model(s) that indicates when a user input is likely to be directed to/handled by a skill, based at least in part on the structure of the user input. Each trained model of the shortlister component 850 may be trained with respect to a different skill. Alternatively, the shortlister component 850 may use one trained model per domain, such as one trained model for skills associated with a weather domain, one trained model for skills associated with a ride sharing domain, etc.

The system component(s) 120 may use the sample user inputs provided by a skill system component(s) 125, and related sample user inputs potentially determined during training, as binary examples to train a model associated with a skill associated with the skill system component(s) 125. The model associated with the particular skill may then be operated at runtime by the shortlister component 850. For example, some sample user inputs may be positive examples (e.g., user inputs that may be used to invoke the skill). Other sample user inputs may be negative examples (e.g., user inputs that may not be used to invoke the skill).

As described above, the shortlister component 850 may include a different trained model for each skill of the system, a different trained model for each domain, or some other combination of trained model(s). For example, the shortlister component 850 may alternatively include a single model. The single model may include a portion trained with respect to characteristics (e.g., semantic characteristics) shared by all skills of the system. The single model may also include skill-specific portions, with each skill-specific portion being trained with respect to a specific skill of the system. Implementing a single model with skill-specific portions may result in less latency than implementing a different trained model for each skill because the single model with skill-specific portions limits the number of characteristics processed on a per skill level.

The portion trained with respect to characteristics shared by more than one skill may be clustered based on domain. For example, a first portion of the portion trained with respect to multiple skills may be trained with respect to weather domain skills, a second portion of the portion trained with respect to multiple skills may be trained with respect to music domain skills, a third portion of the portion trained with respect to multiple skills may be trained with respect to travel domain skills, etc.

Clustering may not be beneficial in every instance because it may cause the shortlister component 850 to output indications of only a portion of the skills that the ASR output data 710 may relate to. For example, a user input may correspond to "tell me about Tom Collins." If the model is clustered based on domain, the shortlister component 850 may determine the user input corresponds to a recipe skill (e.g., a drink recipe) even though the user input may also correspond to an information skill (e.g., including information about a person named Tom Collins).

The NLU component 160 may include one or more recognizers 863. In at least some embodiments, a recognizer 863 may be associated with a skill system component 125 (e.g., the recognizer may be configured to interpret text data to correspond to the skill system component 125). In at least some other examples, a recognizer 863 may be associated with a domain such as smart home, video, music, weather, custom, etc. (e.g., the recognizer may be configured to interpret text data to correspond to the domain).

If the shortlister component 850 determines ASR output data 710 is potentially associated with multiple domains, the recognizers 863 associated with the domains may process the ASR output data 710, while recognizers 863 not indicated in the shortlister component 850's output may not process the ASR output data 710. The "shortlisted" recognizers 863 may process the ASR output data 710 in parallel, in series, partially in parallel, etc. For example, if ASR output data 710 potentially relates to both a communications domain and a music domain, a recognizer associated with the communications domain may process the ASR output data 710 in parallel, or partially in parallel, with a recognizer associated with the music domain processing the ASR output data 710.

Each recognizer 863 may include a named entity recognition (NER) component 862. The NER component 862 attempts to identify grammars and lexical information that may be used to construe meaning with respect to text data input therein. The NER component 862 identifies portions of text data that correspond to a named entity associated with a domain, associated with the recognizer 863 implementing the NER component 862. The NER component 862 (or other component of the NLU component 160) may also determine whether a word refers to an entity whose identity is not explicitly mentioned in the text data, for example "him," "her," "it" or other anaphora, exophora, or the like.

Each recognizer 863, and more specifically each NER component 862, may be associated with a particular grammar database 876, a particular set of intents/actions 874, and a particular personalized lexicon 886. The grammar databases 876, and intents/actions 874 may be stored in an NLU storage 873. Each gazetteer 884 may include domain/skill-indexed lexical information associated with a particular user and/or device 110. For example, a Gazetteer A (884a) includes skill-indexed lexical information 886aa to 886an. A user's music domain lexical information might include album titles, artist names, and song names, for example, whereas a user's communications domain lexical information might include the names of contacts. Since every user's music collection and contact list is presumably different. This personalized information improves later performed entity resolution.

An NER component 862 applies grammar information 876 and lexical information 886 associated with a domain (associated with the recognizer 863 implementing the NER component 862) to determine a mention of one or more entities in text data. In this manner, the NER component 862 identifies "slots" (each corresponding to one or more particular words in text data) that may be useful for later processing. The NER component 862 may also label each slot with a type (e.g., noun, place, city, artist name, song name, etc.).

Each grammar database 876 includes the names of entities (i.e., nouns) commonly found in speech about the particular domain to which the grammar database 876 relates, whereas the lexical information 886 is personalized to the user and/or the device 110 from which the user input originated. For example, a grammar database 876 associated with a shopping domain may include a database of words commonly used when people discuss shopping.

A downstream process called entity resolution (discussed in detail elsewhere herein) links a slot of text data to a specific entity known to the system. To perform entity resolution, the NLU component 160 may utilize gazetteer information (884a-884n) stored in an entity library storage 882. The gazetteer information 884 may be used to match text data (representing a portion of the user input) with text data representing known entities, such as song titles, contact names, etc. Gazetteers 884 may be linked to users (e.g., a particular gazetteer may be associated with a specific user's music collection), may be linked to certain domains (e.g., a shopping domain, a music domain, a video domain, etc.), or may be organized in a variety of other ways.

Each recognizer 863 may also include an intent classification (IC) component 864. An IC component 864 parses text data to determine an intent(s) (associated with the domain associated with the recognizer 863 implementing the IC component 864) that potentially represents the user input. An intent represents to an action a user desires be performed. An IC component 864 may communicate with a database 874 of words linked to intents. For example, a music intent database may link words and phrases such as "quiet," "volume off," and "mute" to a <Mute> intent. An IC component 864 identifies potential intents by comparing words and phrases in text data (representing at least a portion of the user input) to the words and phrases in an intents database 874 (associated with the domain that is associated with the recognizer 863 implementing the IC component 864).

The intents identifiable by a specific IC component 864 are linked to domain-specific (i.e., the domain associated with the recognizer 863 implementing the IC component 864) grammar frameworks 876 with "slots" to be filled. Each slot of a grammar framework 876 corresponds to a portion of text data that the system believes corresponds to an entity. For example, a grammar framework 876 corresponding to a <PlayMusic> intent may correspond to text data sentence structures such as "Play {Artist Name},"

"Play {Album Name}," "Play {Song name}," "Play {Song name} by {Artist Name}," etc. However, to make entity resolution more flexible, grammar frameworks 876 may not be structured as sentences, but rather based on associating slots with grammatical tags.

For example, an NER component 862 may parse text data to identify words as subject, object, verb, preposition, etc. based on grammar rules and/or models prior to recognizing named entities in the text data. An IC component 864 (implemented by the same recognizer 863 as the NER component 862) may use the identified verb to identify an intent. The NER component 862 may then determine a grammar model 876 associated with the identified intent. For example, a grammar model 876 for an intent corresponding to <PlayMusic> may specify a list of slots applicable to play the identified "object" and any object modifier (e.g., a prepositional phrase), such as {Artist Name}, {Album Name}, {Song name}, etc. The NER component 862 may then search corresponding fields in a lexicon 886 (associated with the domain associated with the recognizer 863 implementing the NER component 862), attempting to match words and phrases in text data the NER component 862 previously tagged as a grammatical object or object modifier with those identified in the lexicon 886.

An NER component 862 may perform semantic tagging, which is the labeling of a word or combination of words according to their type/semantic meaning. An NER component 862 may parse text data using heuristic grammar rules, or a model may be constructed using techniques such as Hidden Markov Models, maximum entropy models, log linear models, conditional random fields (CRF), and the like. For example, an NER component 862 implemented by a music domain recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 862 identifies "Play" as a verb based on a word database associated with the music domain, which an IC component 864 (also implemented by the music domain recognizer) may determine corresponds to a <PlayMusic> intent. At this stage, no determination has been made as to the meaning of "mother's little helper" or "the rolling stones," but based on grammar rules and models, the NER component 862 has determined the text of these phrases relates to the grammatical object (i.e., entity) of the user input represented in the text data.

An NER component 862 may tag text data to attribute meaning thereto. For example, an NER component 862 may tag "play mother's little helper by the rolling stones" as: {domain} Music, {intent}<PlayMusic>, {artist name} rolling stones, {media type} SONG, and {song title} mother's little helper. For further example, the NER component 862 may tag "play songs by the rolling stones" as: {domain} Music, {intent}<PlayMusic>, {artist name} rolling stones, and {media type} SONG.

The shortlister component 850 may receive ASR output data 710 output from the ASR component 150 or output from the device 110b (as illustrated in FIG. 9). The ASR component 150 may embed the ASR output data 710 into a form processable by a trained model(s) using sentence embedding techniques as known in the art. Sentence embedding results in the ASR output data 710 including text in a structure that enables the trained models of the shortlister component 850 to operate on the ASR output data 710. For example, an embedding of the ASR output data 710 may be a vector representation of the ASR output data 710.

The shortlister component 850 may make binary determinations (e.g., yes or no) regarding which domains relate to the ASR output data 710. The shortlister component 850 may make such determinations using the one or more trained models described herein above. If the shortlister component 850 implements a single trained model for each domain, the shortlister component 850 may simply run the models that are associated with enabled domains as indicated in a user profile associated with the device 110 and/or user that originated the user input.

The shortlister component 850 may generate n-best list data 915 representing domains that may execute with respect to the user input represented in the ASR output data 710. The size of the n-best list represented in the n-best list data 915 is configurable. In an example, the n-best list data 915 may indicate every domain of the system as well as contain an indication, for each domain, regarding whether the domain is likely capable to execute the user input represented in the ASR output data 710. In another example, instead of indicating every domain of the system, the n-best list data 915 may only indicate the domains that are likely to be able to execute the user input represented in the ASR output data 710. In yet another example, the shortlister component 850 may implement thresholding such that the n-best list data 915 may indicate no more than a maximum number of domains that may execute the user input represented in the ASR output data 710. In an example, the threshold number of domains that may be represented in the n-best list data 915 is ten. In another example, the domains included in the n-best list data 915 may be limited by a threshold a score, where only domains indicating a likelihood to handle the user input is above a certain score (as determined by processing the ASR output data 710 by the shortlister component 850 relative to such domains) are included in the n-best list data 915.

The ASR output data 710 may correspond to more than one ASR hypothesis. When this occurs, the shortlister component 850 may output a different n-best list (represented in the n-best list data 915) for each ASR hypothesis. Alternatively, the shortlister component 850 may output a single n-best list representing the domains that are related to the multiple ASR hypotheses represented in the ASR output data 710.

As indicated above, the shortlister component 850 may implement thresholding such that an n-best list output therefrom may include no more than a threshold number of entries. If the ASR output data 710 includes more than one ASR hypothesis, the n-best list output by the shortlister component 850 may include no more than a threshold number of entries irrespective of the number of ASR hypotheses output by the ASR component 150. Alternatively or in addition, the n-best list output by the shortlister component 850 may include no more than a threshold number of entries for each ASR hypothesis (e.g., no more than five entries for a first ASR hypothesis, no more than five entries for a second ASR hypothesis, etc.).

In addition to making a binary determination regarding whether a domain potentially relates to the ASR output data 710, the shortlister component 850 may generate confidence scores representing likelihoods that domains relate to the ASR output data 710. If the shortlister component 850 implements a different trained model for each domain, the shortlister component 850 may generate a different confidence score for each individual domain trained model that is run. If the shortlister component 850 runs the models of every domain when ASR output data 710 is received, the shortlister component 850 may generate a different confidence score for each domain of the system. If the shortlister component 850 runs the models of only the domains that are associated with skills indicated as enabled in a user profile associated with the device 110 and/or user that originated the user input, the shortlister component 850 may only generate a different confidence score for each domain associated with at least one enabled skill. If the shortlister component 850 implements a single trained model with domain specifically trained portions, the shortlister component 850 may generate a different confidence score for each domain who's specifically trained portion is run. The shortlister component 850 may perform matrix vector modification to obtain confidence scores for all domains of the system in a single instance of processing of the ASR output data 710.

N-best list data 915 including confidence scores that may be output by the shortlister component 850 may be represented as, for example:

Search domain, 0.67
Recipe domain, 0.62
Information domain, 0.57
Shopping domain, 0.42

As indicated, the confidence scores output by the shortlister component 850 may be numeric values. The confidence scores output by the shortlister component 850 may alternatively be binned values (e.g., high, medium, low).

The n-best list may only include entries for domains having a confidence score satisfying (e.g., equaling or exceeding) a minimum threshold confidence score. Alternatively, the shortlister component 850 may include entries for all domains associated with user enabled skills, even if one or more of the domains are associated with confidence scores that do not satisfy the minimum threshold confidence score.

The shortlister component 850 may consider other data 920 when determining which domains may relate to the user input represented in the ASR output data 710 as well as respective confidence scores. The other data 920 may include usage history data associated with the device 110 and/or user that originated the user input. For example, a confidence score of a domain may be increased if user inputs originated by the device 110 and/or user routinely invoke the domain. Conversely, a confidence score of a domain may be decreased if user inputs originated by the device 110 and/or user rarely invoke the domain. Thus, the other data 920 may include an indicator of the user associated with the ASR output data 710, for example as determined by a user recognition component.

The other data 920 may be character embedded prior to being input to the shortlister component 850. The other data 920 may alternatively be embedded using other techniques known in the art prior to being input to the shortlister component 850.

The other data 920 may also include data indicating the domains associated with skills that are enabled with respect to the device 110 and/or user that originated the user input. The shortlister component 850 may use such data to determine which domain-specific trained models to run. That is, the shortlister component 850 may determine to only run the trained models associated with domains that are associated with user-enabled skills. The shortlister component 850 may alternatively use such data to alter confidence scores of domains.

As an example, considering two domains, a first domain associated with at least one enabled skill and a second domain not associated with any user-enabled skills of the user that originated the user input, the shortlister component 850 may run a first model specific to the first domain as well as a second model specific to the second domain. Alternatively, the shortlister component 850 may run a model configured to determine a score for each of the first and second domains. The shortlister component 850 may determine a same confidence score for each of the first and second domains in the first instance. The shortlister component 850 may then alter those confidence scores based on which domains is associated with at least one skill enabled by the present user. For example, the shortlister component 850 may increase the confidence score associated with the domain associated with at least one enabled skill while leaving the confidence score associated with the other domain the same. Alternatively, the shortlister component 850 may leave the confidence score associated with the domain associated with at least one enabled skill the same while decreasing the confidence score associated with the other domain. Moreover, the shortlister component 850 may increase the confidence score associated with the domain associated with at least one enabled skill as well as decrease the confidence score associated with the other domain.

As indicated, a user profile may indicate which skills a corresponding user has enabled (e.g., authorized to execute using data associated with the user). Such indications may be stored in the profile storage 170. When the shortlister component 850 receives the ASR output data 710, the shortlister component 850 may determine whether profile data associated with the user and/or device 110 that originated the command includes an indication of enabled skills.

The other data 920 may also include data indicating the type of the device 110. The type of a device may indicate the output capabilities of the device. For example, a type of device may correspond to a device with a visual display, a headless (e.g., displayless) device, whether a device is mobile or stationary, whether a device includes audio playback capabilities, whether a device includes a camera, other device hardware configurations, etc. The shortlister component 850 may use such data to determine which domain-specific trained models to run. For example, if the device 110 corresponds to a displayless type device, the shortlister component 850 may determine not to run trained models specific to domains that output video data. The shortlister component 850 may alternatively use such data to alter confidence scores of domains.

As an example, considering two domains, one that outputs audio data and another that outputs video data, the shortlister component 850 may run a first model specific to the domain that generates audio data as well as a second model specific to the domain that generates video data. Alternatively the shortlister component 850 may run a model configured to determine a score for each domain. The shortlister component 850 may determine a same confidence score for each of the domains in the first instance. The shortlister component 850 may then alter the original confidence scores based on the type of the device 110 that originated the user input corresponding to the ASR output data 710. For example, if the device 110 is a displayless device, the shortlister component 850 may increase the confidence score associated with the domain that generates audio data while leaving the confidence score associated with the domain that generates video data the same. Alternatively, if the device 110 is a displayless device, the shortlister component 850 may leave the confidence score associated with the domain that generates audio data the same while decreasing the confidence score associated with the domain that generates video data. Moreover, if the device 110 is a displayless device, the shortlister component 850 may increase the confidence score associated with the domain that generates audio data as well as decrease the confidence score associated with the domain that generates video data.

The type of device information represented in the other data 920 may represent output capabilities of the device to be used to output content to the user, which may not necessarily be the user input originating device. For example, a user may input a spoken user input corresponding to "play Game of Thrones" to a device not including a display. The system may determine a smart TV or other display device (associated with the same user profile) for outputting Game of Thrones. Thus, the other data 920 may represent the smart TV of other display device, and not the displayless device that captured the spoken user input.

The other data 920 may also include data indicating the user input originating device's speed, location, or other mobility information. For example, the device may correspond to a vehicle including a display. If the vehicle is moving, the shortlister component 850 may decrease the confidence score associated with a domain that generates video data as it may be undesirable to output video content to a user while the user is driving. The device may output data to the system component(s) 120 indicating when the device is moving.

The other data 920 may also include data indicating a currently invoked domain. For example, a user may speak a first (e.g., a previous) user input causing the system to invoke a music domain skill to output music to the user. As the system is outputting music to the user, the system may receive a second (e.g., the current) user input. The shortlister component 850 may use such data to alter confidence scores of domains. For example, the shortlister component 850 may run a first model specific to a first domain as well as a second model specific to a second domain. Alternatively, the shortlister component 850 may run a model configured to determine a score for each domain. The shortlister component 850 may also determine a same confidence score for each of the domains in the first instance. The shortlister component 850 may then alter the original confidence scores based on the first domain being invoked to cause the system to output content while the current user input was received. Based on the first domain being invoked, the shortlister component 850 may (i) increase the confidence score associated with the first domain while leaving the confidence score associated with the second domain the same, (ii) leave the confidence score associated with the first domain the same while decreasing the confidence score associated with the second domain, or (iii) increase the confidence score associated with the first domain as well as decrease the confidence score associated with the second domain.

The thresholding implemented with respect to the n-best list data 915 generated by the shortlister component 850 as well as the different types of other data 920 considered by the shortlister component 850 are configurable. For example, the shortlister component 850 may update confidence scores as more other data 920 is considered. For further example, the n-best list data 915 may exclude relevant domains if thresholding is implemented. Thus, for example, the shortlister component 850 may include an indication of a domain in the n-best list 915 unless the shortlister component 850 is one hundred percent confident that the domain may not execute the user input represented in the ASR output data 710 (e.g., the shortlister component 850 determines a confidence score of zero for the domain).

The shortlister component 850 may send the ASR output data 710 to recognizers 863 associated with domains represented in the n-best list data 915. Alternatively, the shortlister component 850 may send the n-best list data 915 or some other indicator of the selected subset of domains to another component (such as the orchestrator component 130) which may in turn send the ASR output data 710 to the recognizers 863 corresponding to the domains included in the n-best list data 915 or otherwise indicated in the indicator. If the shortlister component 850 generates an n-best list representing domains without any associated confidence scores, the shortlister component 850/orchestrator component 130 may send the ASR output data 710 to recognizers 863 associated with domains that the shortlister component 850 determines may execute the user input. If the shortlister component 850 generates an n-best list representing domains with associated confidence scores, the shortlister component 850/orchestrator component 130 may send the ASR output data 710 to recognizers 863 associated with domains associated with confidence scores satisfying (e.g., meeting or exceeding) a threshold minimum confidence score.

A recognizer 863 may output tagged text data generated by an NER component 862 and an IC component 864, as described herein above. The NLU component 160 may compile the output tagged text data of the recognizers 863 into a single cross-domain n-best list 940 and may send the cross-domain n-best list 940 to a pruning component 950. Each entry of tagged text (e.g., each NLU hypothesis) represented in the cross-domain n-best list data 940 may be associated with a respective score indicating a likelihood that the NLU hypothesis corresponds to the domain associated with the recognizer 863 from which the NLU hypothesis was output. For example, the cross-domain n-best list data 940 may be represented as (with each line corresponding to a different NLU hypothesis):

[0.95] Intent: <PlayMusic> ArtistName: Beethoven SongName: Waldstein Sonata

[0.70] Intent: <PlayVideo> ArtistName: Beethoven VideoName: Waldstein Sonata

[0.01] Intent: <PlayMusic> ArtistName: Beethoven AlbumName: Waldstein Sonata

[0.01] Intent: <PlayMusic> SongName: Waldstein Sonata

The pruning component 950 may sort the NLU hypotheses represented in the cross-domain n-best list data 940 according to their respective scores. The pruning component 950 may perform score thresholding with respect to the cross-domain NLU hypotheses. For example, the pruning component 950 may select NLU hypotheses associated with scores satisfying (e.g., meeting and/or exceeding) a threshold score. The pruning component 950 may also or alternatively perform number of NLU hypothesis thresholding. For example, the pruning component 950 may select the top scoring NLU hypothesis(es). The pruning component 950 may output a portion of the NLU hypotheses input thereto. The purpose of the pruning component 950 is to create a reduced list of NLU hypotheses so that downstream, more resource intensive, processes may only operate on the NLU hypotheses that most likely represent the user's intent.

The NLU component 160 may include a light slot filler component 952. The light slot filler component 952 can take text from slots represented in the NLU hypotheses output by the pruning component 950 and alter them to make the text more easily processed by downstream components. The light slot filler component 952 may perform low latency operations that do not involve heavy operations such as reference to a knowledge base (e.g., 872. The purpose of the light slot filler component 952 is to replace words with other words or values that may be more easily understood by downstream components. For example, if a NLU hypothesis includes the word "tomorrow," the light slot filler component 952 may replace the word "tomorrow" with an actual date for purposes of downstream processing. Similarly, the light slot filler component 952 may replace the word "CD" with "album" or the words "compact disc." The replaced words are then included in the cross-domain n-best list data 960.

The cross-domain n-best list data 960 may be input to an entity resolution component 165. The entity resolution component 165 can apply rules or other instructions to standardize labels or tokens from previous stages into an intent/slot representation. The precise transformation may depend on the domain. For example, for a travel domain, the entity resolution component 165 may transform text corresponding to "Boston airport" to the standard BOS three-letter code referring to the airport. The entity resolution component 165 can refer to a knowledge base (e.g., 872) that is used to specifically identify the precise entity referred to in each slot of each NLU hypothesis represented in the cross-domain n-best list data 960. Specific intent/slot combinations may also be tied to a particular source, which may then be used to resolve the text. In the example "play songs by the stones," the entity resolution component 165 may reference a personal music catalog, Amazon Music account, a user profile, or the like. The entity resolution component 165 may output an altered n-best list that is based on the cross-domain n-best list 960 but that includes more detailed information (e.g., entity IDs) about the specific entities mentioned in the slots and/or more detailed slot data that can eventually be used by a skill. The NLU component 160 may include multiple entity resolution components 165 and each entity resolution component 165 may be specific to one or more domains.

The NLU component 160 may include a reranker 990. The reranker 990 may assign a particular confidence score to each NLU hypothesis input therein. The confidence score of a particular NLU hypothesis may be affected by whether the NLU hypothesis has unfilled slots. For example, if a NLU hypothesis includes slots that are all filled/resolved, that NLU hypothesis may be assigned a higher confidence score than another NLU hypothesis including at least some slots that are unfilled/unresolved by the entity resolution component 165.

The reranker 990 may apply re-scoring, biasing, or other techniques. The reranker 990 may consider not only the data output by the entity resolution component 165, but may also consider other data 991. The other data 991 may include a variety of information. For example, the other data 991 may include skill rating or popularity data. For example, if one skill has a high rating, the reranker 990 may increase the score of a NLU hypothesis that may be processed by the skill. The other data 991 may also include information about skills that have been enabled by the user that originated the user input. For example, the reranker 990 may assign higher scores to NLU hypothesis that may be processed by enabled skills than NLU hypothesis that may be processed by non-enabled skills. The other data 991 may also include data indicating user usage history, such as if the user that originated the user input regularly uses a particular skill or does so at particular times of day. The other data 991 may additionally include data indicating date, time, location, weather, type of device 110, user identifier, context, as well as other information. For example, the reranker 990 may consider when any particular skill is currently active (e.g., music being played, a game being played, etc.).

As illustrated and described, the entity resolution component 165 is implemented prior to the reranker 990. The entity resolution component 165 may alternatively be implemented after the reranker 990. Implementing the entity resolution component 165 after the reranker 990 limits the NLU hypotheses processed by the entity resolution component 165 to only those hypotheses that successfully pass through the reranker 990.

The reranker 990 may be a global reranker (e.g., one that is not specific to any particular domain). Alternatively, the NLU component 160 may implement one or more domain-specific rerankers. Each domain-specific reranker may rerank NLU hypotheses associated with the domain. Each domain-specific reranker may output an n-best list of reranked hypotheses (e.g., 5-10 hypotheses).

The NLU component 160 may perform NLU processing described above with respect to domains associated with skills wholly implemented as part of the system component(s) 120 (e.g., designated 190 in FIG. 1). The NLU component 160 may separately perform NLU processing described above with respect to domains associated with skills that are at least partially implemented as part of the skill system component(s) 125. In an example, the shortlister component 850 may only process with respect to these latter domains. Results of these two NLU processing paths may be merged into NLU output data 985, which may be sent to a post-NLU ranker 965, which may be implemented by the system component(s) 120.

The post-NLU ranker 965 may include a statistical component that produces a ranked list of intent/skill pairs with associated confidence scores. Each confidence score may indicate an adequacy of the skill's execution of the intent with respect to NLU results data associated with the skill. The post-NLU ranker 965 may operate one or more trained models configured to process the NLU results data 985, skill result data 930, and the other data 920 in order to output ranked output data 925. The ranked output data 925 may include an n-best list where the NLU hypotheses in the NLU results data 985 are reordered such that the n-best list in the ranked output data 925 represents a prioritized list of skills to respond to a user input as determined by the post-NLU ranker 965. The ranked output data 925 may also include (either as part of an n-best list or otherwise) individual respective scores corresponding to skills where each score indicates a probability that the skill (and/or its respective result data) corresponds to the user input.

The system may be configured with thousands, tens of thousands, etc. skills. The post-NLU ranker 965 enables the system to better determine the best skill to execute the user input. For example, first and second NLU hypotheses in the NLU results data 985 may substantially correspond to each other (e.g., their scores may be significantly similar), even though the first NLU hypothesis may be processed by a first skill and the second NLU hypothesis may be processed by a second skill. The first NLU hypothesis may be associated with a first confidence score indicating the system's confidence with respect to NLU processing performed to generate the first NLU hypothesis. Moreover, the second NLU hypothesis may be associated with a second confidence score indicating the system's confidence with respect to NLU processing performed to generate the second NLU hypothesis. The first confidence score may be similar or identical to the second confidence score. The first confidence score and/or the second confidence score may be a numeric value (e.g., from 0.0 to 1.0). Alternatively, the first confidence score and/or the second confidence score may be a binned value (e.g., low, medium, high).

The post-NLU ranker 965 (or other scheduling component such as orchestrator component 130) may solicit the first skill and the second skill to provide potential result data 930 based on the first NLU hypothesis and the second NLU hypothesis, respectively. For example, the post-NLU ranker 965 may send the first NLU hypothesis to the first skill component 190*a* along with a request for the first skill component 190*a* to at least partially execute with respect to the first NLU hypothesis. The post-NLU ranker 965 may also send the second NLU hypothesis to the second skill component 190*b* along with a request for the second skill component 190*b* to at least partially execute with respect to the second NLU hypothesis. The post-NLU ranker 965 receives, from the first skill component 190*a*, first result data 930*a* generated from the first skill component 190*a*'s execution with respect to the first NLU hypothesis. The post-NLU ranker 965 also receives, from the second skill component 190*b*, second results data 930*b* generated from the second skill component 190*b*'s execution with respect to the second NLU hypothesis.

The result data 930 may include various portions. For example, the result data 930 may include content (e.g., audio data, text data, and/or video data) to be output to a user. The result data 930 may also include a unique identifier used by the system component(s) 120 and/or the skill system component(s) 125 to locate the data to be output to a user. The result data 930 may also include an instruction. For example, if the user input corresponds to "turn on the light," the result data 930 may include an instruction causing the system to turn on a light associated with a profile of the device (110*a*/110*b*) and/or user.

The post-NLU ranker 965 may consider the first result data 930*a* and the second result data 930*b* to alter the first confidence score and the second confidence score of the first NLU hypothesis and the second NLU hypothesis, respectively. That is, the post-NLU ranker 965 may generate a third confidence score based on the first result data 930*a* and the first confidence score. The third confidence score may correspond to how likely the post-NLU ranker 965 determines the first skill will correctly respond to the user input. The post-NLU ranker 965 may also generate a fourth confidence score based on the second result data 930*b* and the second confidence score. One skilled in the art will appreciate that a first difference between the third confidence score and the fourth confidence score may be greater than a second difference between the first confidence score and the second confidence score. The post-NLU ranker 965 may also consider the other data 920 to generate the third confidence score and the fourth confidence score. While it has been described that the post-NLU ranker 965 may alter the confidence scores associated with first and second NLU hypotheses, one skilled in the art will appreciate that the post-NLU ranker 965 may alter the confidence scores of more than two NLU hypotheses. The post-NLU ranker 965 may select the result data 930 associated with the skill component 190 with the highest altered confidence score to be the data output in response to the current user input. The post-NLU ranker 965 may also consider the ASR output data 710 to alter the NLU hypotheses confidence scores.

The orchestrator component 130 may, prior to sending the NLU results data 985 to the post-NLU ranker 965, associate intents in the NLU hypotheses with skill components 190. For example, if a NLU hypothesis includes a <PlayMusic> intent, the orchestrator component 130 may associate the NLU hypothesis with one or more skill components 190 that can execute the <PlayMusic> intent. Thus, the orchestrator component 130 may send the NLU results data 985, including NLU hypotheses paired with skill components 190, to the post-NLU ranker 965. In response to ASR output data 710 corresponding to "what should I do for dinner today," the orchestrator component 130 may generates pairs of skill components 190 with associated NLU hypotheses corresponding to:

- Skill 1/NLU hypothesis including <Help> intent
- Skill 2/NLU hypothesis including <Order> intent
- Skill 3/NLU hypothesis including <DishType> intent The post-NLU ranker 965 queries each skill component 190, paired with a NLU hypothesis in the NLU output data 985, to provide result data 930 based on the NLU hypothesis with which it is associated. That is, with respect to each skill, the post-NLU ranker 965 colloquially asks the each skill "if given this NLU hypothesis, what would you do with it." According to the above example, the post-NLU ranker 965 may send skill components 190 the following data:

- Skill 1: First NLU hypothesis including <Help> intent indicator
- Skill 2: Second NLU hypothesis including <Order> intent indicator
- Skill 3: Third NLU hypothesis including <DishType> intent indicator The post-NLU ranker 965 may query each of the skill components 190 in parallel or substantially in parallel.

A skill component 190 may provide the post-NLU ranker 965 with various data and indications in response to the post-NLU ranker 965 soliciting the skill component 190 for result data 930. A skill component 190 may simply provide the post-NLU ranker 965 with an indication of whether or not the skill can execute with respect to the NLU hypothesis it received. A skill component 190 may also or alternatively provide the post-NLU ranker 965 with output data generated based on the NLU hypothesis it received. In some situations, a skill component 190 may need further information in addition to what is represented in the received NLU hypothesis to provide output data responsive to the user input. In these situations, the skill component 190 may provide the post-NLU ranker 965 with result data 930 indicating slots of a framework that the skill component 190 further needs filled or entities that the skill component 190 further needs resolved prior to the skill component 190 being able to provided result data 930 responsive to the user input. The skill component 190 may also provide the post-NLU ranker 965 with an instruction and/or computer-generated speech indicating how the skill component 190 recommends the system solicit further information needed by the skill component 190. The skill component 190 may further provide the post-NLU ranker 965 with an indication of whether the skill component 190 will have all needed information after the user provides additional information a single time, or whether the skill component 190 will need the user to provide various kinds of additional information prior to the skill component 190 having all needed information. According to the above example, skill components 190 may provide the post-NLU ranker 965 with the following:

- Skill 1: indication representing the skill can execute with respect to a NLU hypothesis including the <Help> intent indicator
- Skill 2: indication representing the skill needs to the system to obtain further information
- Skill 3: indication representing the skill can provide numerous results in response to the third NLU hypothesis including the <DishType> intent indicator Result data 930 includes an indication provided by a skill component 190 indicating whether or not the skill component 190 can execute with respect to a NLU hypothesis; data generated by a skill component 190 based on a NLU hypothesis; as well as an indication provided by a skill component 190 indicating the skill component 190 needs further information in addition to what is represented in the received NLU hypothesis.

The post-NLU ranker 965 uses the result data 930 provided by the skill components 190 to alter the NLU processing confidence scores generated by the reranker 990. That is, the post-NLU ranker 965 uses the result data 930 provided by the queried skill components 190 to create larger differences between the NLU processing confidence scores generated by the reranker 990. Without the post-NLU ranker 965, the system may not be confident enough to determine an output in response to a user input, for example when the NLU hypotheses associated with multiple skills are too close for the system to confidently determine a single skill component 190 to invoke to respond to the user input. For example, if the system does not implement the post-NLU ranker 965, the system may not be able to determine whether to obtain output data from a general reference information skill or a medical information skill in response to a user input corresponding to "what is acne."

The post-NLU ranker 965 may prefer skill components 190 that provide result data 930 responsive to NLU hypotheses over skill components 190 that provide result data 930 corresponding to an indication that further information is needed, as well as skill components 190 that provide result data 930 indicating they can provide multiple responses to received NLU hypotheses. For example, the post-NLU ranker 965 may generate a first score for a first skill component 190a that is greater than the first skill's NLU confidence score based on the first skill component 190a providing result data 930a including a response to a NLU hypothesis. For further example, the post-NLU ranker 965 may generate a second score for a second skill component 190b that is less than the second skill's NLU confidence score based on the second skill component 190b providing result data 930b indicating further information is needed for the second skill component 190b to provide a response to a NLU hypothesis. Yet further, for example, the post-NLU ranker 965 may generate a third score for a third skill component 190c that is less than the third skill's NLU confidence score based on the third skill component 190c providing result data 930c indicating the third skill component 190c can provide multiple responses to a NLU hypothesis.

The post-NLU ranker 965 may consider other data 920 in determining scores. The other data 920 may include rankings associated with the queried skill components 190. A ranking may be a system ranking or a user-specific ranking. A ranking may indicate a veracity of a skill from the perspective of one or more users of the system. For example, the post-NLU ranker 965 may generate a first score for a first skill component 190a that is greater than the first skill's NLU processing confidence score based on the first skill component 190a being associated with a high ranking. For further example, the post-NLU ranker 965 may generate a second score for a second skill component 190b that is less than the second skill's NLU processing confidence score based on the second skill component 190b being associated with a low ranking.

The other data 920 may include information indicating whether or not the user that originated the user input has enabled one or more of the queried skill components 190. For example, the post-NLU ranker 965 may generate a first score for a first skill component 190a that is greater than the first skill's NLU processing confidence score based on the first skill component 190a being enabled by the user that originated the user input. For further example, the post-NLU ranker 965 may generate a second score for a second skill component 190b that is less than the second skill's NLU processing confidence score based on the second skill component 190b not being enabled by the user that originated the user input. When the post-NLU ranker 965 receives the NLU results data 985, the post-NLU ranker 965 may determine whether profile data, associated with the user and/or device that originated the user input, includes indications of enabled skills.

The other data 920 may include information indicating output capabilities of a device that will be used to output content, responsive to the user input, to the user. The system may include devices that include speakers but not displays, devices that include displays but not speakers, and devices that include speakers and displays. If the device that will output content responsive to the user input includes one or more speakers but not a display, the post-NLU ranker 965 may increase the NLU processing confidence score associated with a first skill configured to output audio data and/or decrease the NLU processing confidence score associated with a second skill configured to output visual data (e.g., image data and/or video data). If the device that will output content responsive to the user input includes a display but not one or more speakers, the post-NLU ranker 965 may increase the NLU processing confidence score associated with a first skill configured to output visual data and/or decrease the NLU processing confidence score associated with a second skill configured to output audio data.

The other data 920 may include information indicating the veracity of the result data 930 provided by a skill component 190. For example, if a user says "tell me a recipe for pasta sauce," a first skill component 190a may provide the post-NLU ranker 965 with first result data 930a corresponding to a first recipe associated with a five star rating and a second skill component 190b may provide the post-NLU ranker 965 with second result data 930b corresponding to a second recipe associated with a one star rating. In this situation, the post-NLU ranker 965 may increase the NLU processing confidence score associated with the first skill component 190a based on the first skill component 190a providing the first result data 930a associated with the five star rating and/or decrease the NLU processing confidence score associated with the second skill component 190b based on the second skill component 190b providing the second result data 930b associated with the one star rating.

The other data 920 may include information indicating the type of device that originated the user input. For example, the device may correspond to a "hotel room" type if the device is located in a hotel room. If a user inputs a command corresponding to "order me food" to the device located in the hotel room, the post-NLU ranker 965 may increase the NLU processing confidence score associated with a first skill component 190a corresponding to a room service skill associated with the hotel and/or decrease the NLU processing confidence score associated with a second skill component 190b corresponding to a food skill not associated with the hotel.

The other data 920 may include information indicating a location of the device and/or user that originated the user input. The system may be configured with skill components 190 that may only operate with respect to certain geographic locations. For example, a user may provide a user input corresponding to "when is the next train to Portland." A first skill component 190a may operate with respect to trains that arrive at, depart from, and pass through Portland, Oregon. A second skill component 190b may operate with respect to trains that arrive at, depart from, and pass through Portland, Maine. If the device and/or user that originated the user input is located in Seattle, Washington, the post-NLU ranker 965 may increase the NLU processing confidence score associated with the first skill component 190a and/or decrease the NLU processing confidence score associated with the second skill component 190b. Likewise, if the device and/or user that originated the user input is located in Boston, Massachusetts, the post-NLU ranker 965 may increase the NLU processing confidence score associated with the second skill component 190b and/or decrease the NLU processing confidence score associated with the first skill component 190a.

The other data 920 may include information indicating a time of day. The system may be configured with skill components 190 that operate with respect to certain times of day. For example, a user may provide a user input corresponding to "order me food." A first skill component 190a may generate first result data 930a corresponding to breakfast. A second skill component 190b may generate second result data 930b corresponding to dinner. If the system component(s) 120 receives the user input in the morning, the post-NLU ranker 965 may increase the NLU processing confidence score associated with the first skill component 190a and/or decrease the NLU processing confidence score associated with the second skill component 190b. If the system component(s) 120 receives the user input in the afternoon or evening, the post-NLU ranker 965 may increase the NLU processing confidence score associated with the second skill component 190b and/or decrease the NLU processing confidence score associated with the first skill component 190a.

The other data 920 may include information indicating user preferences. The system may include multiple skill components 190 configured to execute in substantially the same manner. For example, a first skill component 190a and a second skill component 190b may both be configured to order food from respective restaurants. The system may store a user preference (e.g., in the profile storage 170) that is associated with the user that provided the user input to the system component(s) 120 as well as indicates the user prefers the first skill component 190a over the second skill component 190b. Thus, when the user provides a user input that may be executed by both the first skill component 190a and the second skill component 190b, the post-NLU ranker 965 may increase the NLU processing confidence score associated with the first skill component 190a and/or decrease the NLU processing confidence score associated with the second skill component 190b.

The other data 920 may include information indicating system usage history associated with the user that originated the user input. For example, the system usage history may indicate the user originates user inputs that invoke a first skill component 190a more often than the user originates user inputs that invoke a second skill component 190b. Based on this, if the present user input may be executed by both the first skill component 190a and the second skill component 190b, the post-NLU ranker 965 may increase the NLU processing confidence score associated with the first skill component 190a and/or decrease the NLU processing confidence score associated with the second skill component 190b.

The other data 920 may include information indicating a speed at which the device 110 that originated the user input is traveling. For example, the device 110 may be located in a moving vehicle, or may be a moving vehicle. When a device 110 is in motion, the system may prefer audio outputs rather than visual outputs to decrease the likelihood of distracting the user (e.g., a driver of a vehicle). Thus, for example, if the device 110 that originated the user input is moving at or above a threshold speed (e.g., a speed above an average user's walking speed), the post-NLU ranker 965 may increase the NLU processing confidence score associated with a first skill component 190a that generates audio data. The post-NLU ranker 965 may also or alternatively decrease the NLU processing confidence score associated with a second skill component 190b that generates image data or video data.

The other data 920 may include information indicating how long it took a skill component 190 to provide result data 930 to the post-NLU ranker 965. When the post-NLU ranker 965 multiple skill components 190 for result data 930, the skill components 190 may respond to the queries at different speeds. The post-NLU ranker 965 may implement a latency budget. For example, if the post-NLU ranker 965 determines a skill component 190 responds to the post-NLU ranker 965 within a threshold amount of time from receiving a query from the post-NLU ranker 965, the post-NLU ranker 965 may increase the NLU processing confidence score associated with the skill component 190. Conversely, if the post-NLU ranker 965 determines a skill component 190 does not respond to the post-NLU ranker 965 within a threshold amount of time from receiving a query from the post-NLU ranker 965, the post-NLU ranker 965 may decrease the NLU processing confidence score associated with the skill component 190.

It has been described that the post-NLU ranker 965 uses the other data 920 to increase and decrease NLU processing confidence scores associated with various skill components 190 that the post-NLU ranker 965 has already requested result data from. Alternatively, the post-NLU ranker 965 may use the other data 920 to determine which skill components 190 to request result data from. For example, the post-NLU ranker 965 may use the other data 920 to increase and/or decrease NLU processing confidence scores associated with skill components 190 associated with the NLU results data 985 output by the NLU component 160. The post-NLU ranker 965 may select n-number of top scoring altered NLU processing confidence scores. The post-NLU ranker 965 may then request result data 930 from only the skill components 190 associated with the selected n-number of NLU processing confidence scores.

As described, the post-NLU ranker 965 may request result data 930 from all skill components 190 associated with the NLU results data 985 output by the NLU component 160. Alternatively, the system component(s) 120 may prefer result data 930 from skills implemented entirely by the system component(s) 120 rather than skills at least partially implemented by the skill system component(s) 125. Therefore, in the first instance, the post-NLU ranker 965 may request result data 930 from only skills associated with the NLU results data 985 and entirely implemented by the system component(s) 120. The post-NLU ranker 965 may only request result data 930 from skills associated with the NLU results data 985, and at least partially implemented by the skill system component(s) 125, if none of the skills, wholly implemented by the system component(s) 120, provide the post-NLU ranker 965 with result data 930 indicating either data response to the NLU results data 985, an indication that the skill can execute the user input, or an indication that further information is needed.

As indicated above, the post-NLU ranker 965 may request result data 930 from multiple skill components 190. If one of the skill components 190 provides result data 930 indicating a response to a NLU hypothesis and the other skills provide result data 930 indicating either they cannot execute or they need further information, the post-NLU ranker 965 may select the result data 930 including the response to the NLU hypothesis as the data to be output to the user. If more than one of the skill components 190 provides result data 930 indicating responses to NLU hypotheses, the post-NLU ranker 965 may consider the other data 920 to generate altered NLU processing confidence scores, and select the result data 930 of the skill associated with the greatest score as the data to be output to the user.

A system that does not implement the post-NLU ranker 965 may select the highest scored NLU hypothesis in the NLU results data 985. The system may send the NLU hypothesis to a skill component 190 associated therewith along with a request for output data. In some situations, the skill component 190 may not be able to provide the system with output data. This results in the system indicating to the user that the user input could not be processed even though another skill associated with lower ranked NLU hypothesis could have provided output data responsive to the user input.

The post-NLU ranker 965 reduces instances of the aforementioned situation. As described, the post-NLU ranker 965 queries multiple skills associated with the NLU results data 985 to provide result data 930 to the post-NLU ranker 965 prior to the post-NLU ranker 965 ultimately determining the skill component 190 to be invoked to respond to the user input. Some of the skill components 190 may provide result data 930 indicating responses to NLU hypotheses while other skill components 190 may providing result data 930 indicating the skills cannot provide responsive data. Whereas a system not implementing the post-NLU ranker 965 may select one of the skill components 190 that could not provide a response, the post-NLU ranker 965 only selects a skill component 190 that provides the post-NLU ranker 965 with result data corresponding to a response, indicating further information is needed, or indicating multiple responses can be generated.

The post-NLU ranker 965 may select result data 930, associated with the skill component 190 associated with the highest score, for output to the user. Alternatively, the post-NLU ranker 965 may output ranked output data 925 indicating skill components 190 and their respective post-NLU ranker rankings. Since the post-NLU ranker 965 receives result data 930, potentially corresponding to a response to the user input, from the skill components 190 prior to post-NLU ranker 965 selecting one of the skills or outputting the ranked output data 925, little to no latency occurs from the time skills provide result data 930 and the time the system outputs responds to the user.

If the post-NLU ranker 965 selects result audio data to be output to a user and the system determines content should be output audibly, the post-NLU ranker 965 (or another component of the system component(s) 120) may cause the device 110*a* and/or the device 110*b* to output audio corresponding to the result audio data. If the post-NLU ranker 965 selects result text data to output to a user and the system determines content should be output visually, the post-NLU ranker 965 (or another component of the system component(s) 120) may cause the device 110*b* to display text corresponding to the result text data. If the post-NLU ranker 965 selects result audio data to output to a user and the system determines content should be output visually, the post-NLU ranker 965 (or another component of the system component(s) 120) may send the result audio data to the ASR component 150. The ASR component 150 may generate output text data corresponding to the result audio data. The system component(s) 120 may then cause the device 110*b* to display text corresponding to the output text data. If the post-NLU ranker 965 selects result text data to output to a user and the system determines content should be output audibly, the post-NLU ranker 965 (or another component of the system component(s) 120) may send the result text data to the TTS component 180. The TTS component 180 may generate output audio data (corresponding to computer-generated speech) based on the result text data. The system component(s) 120 may then cause the device 110*a* and/or the device 110*b* to output audio corresponding to the output audio data.

As described, a skill component 190 may provide result data 930 either indicating a response to the user input, indicating more information is needed for the skill component 190 to provide a response to the user input, or indicating the skill component 190 cannot provide a response to the user input. If the skill component 190 associated with the highest post-NLU ranker score provides the post-NLU ranker 965 with result data 930 indicating a response to the user input, the post-NLU ranker 965 (or another component of the system component(s) 120, such as the orchestrator component 130) may simply cause content corresponding to the result data 930 to be output to the user. For example, the post-NLU ranker 965 may send the result data 930 to the orchestrator component 130. The orchestrator component 130 may cause the result data 930 to be sent to the device (110*a*/110*b*), which may output audio and/or display text corresponding to the result data 930. The orchestrator component 130 may send the result data 930 to the ASR component 150 to generate output text data and/or may send the result data 930 to the TTS component 180 to generate output audio data, depending on the situation.

The skill component 190 associated with the highest post-NLU ranker score may provide the post-NLU ranker 965 with result data 930 indicating more information is needed as well as instruction data. The instruction data may indicate how the skill component 190 recommends the system obtain the needed information. For example, the instruction data may correspond to text data or audio data (i.e., computer-generated speech) corresponding to "please indicate _____." The instruction data may be in a format (e.g., text data or audio data) capable of being output by the device (110*a*/110*b*). When this occurs, the post-NLU ranker 965 may simply cause the received instruction data be output by the device (110*a*/110*b*). Alternatively, the instruction data may be in a format that is not capable of being output by the device (110*a*/110*b*). When this occurs, the post-NLU ranker 965 may cause the ASR component 150 or the TTS component 180 to process the instruction data, depending on the situation, to generate instruction data that may be output by the device (110*a*/110*b*). Once the user provides the system with all further information needed by the skill component 190, the skill component 190 may provide the system with result data 930 indicating a response to the user input, which may be output by the system as detailed above.

The system may include "informational" skill components 190 that simply provide the system with information, which the system outputs to the user. The system may also include "transactional" skill components 190 that require a system instruction to execute the user input. Transactional skill components 190 include ride sharing skills, flight booking skills, etc. A transactional skill component 190 may simply provide the post-NLU ranker 965 with result data 930 indicating the transactional skill component 190 can execute the user input. The post-NLU ranker 965 may then cause the system to solicit the user for an indication that the system is permitted to cause the transactional skill component 190 to execute the user input. The user-provided indication may be an audible indication or a tactile indication (e.g., activation of a virtual button or input of text via a virtual keyboard). In response to receiving the user-provided indication, the system may provide the transactional skill component 190 with data corresponding to the indication. In response, the transactional skill component 190 may execute the command (e.g., book a flight, book a train ticket, etc.). Thus, while the system may not further engage an informational skill component 190 after the informational skill component 190 provides the post-NLU ranker 965 with result data 930, the system may further engage a transactional skill component 190 after the transactional skill component 190 provides the post-NLU ranker 965 with result data 930 indicating the transactional skill component 190 may execute the user input.

In some instances, the post-NLU ranker 965 may generate respective scores for first and second skills that are too close (e.g., are not different by at least a threshold difference) for the post-NLU ranker 965 to make a confident determination regarding which skill should execute the user input. When this occurs, the system may request the user indicate which skill the user prefers to execute the user input. The system may output TTS-generated speech to the user to solicit which skill the user wants to execute the user input.

One or more models implemented by components of the orchestrator component 130, post-NLU ranker 965, shortlister 850, or other component may be trained and operated according to various machine learning techniques.

Figure 10:
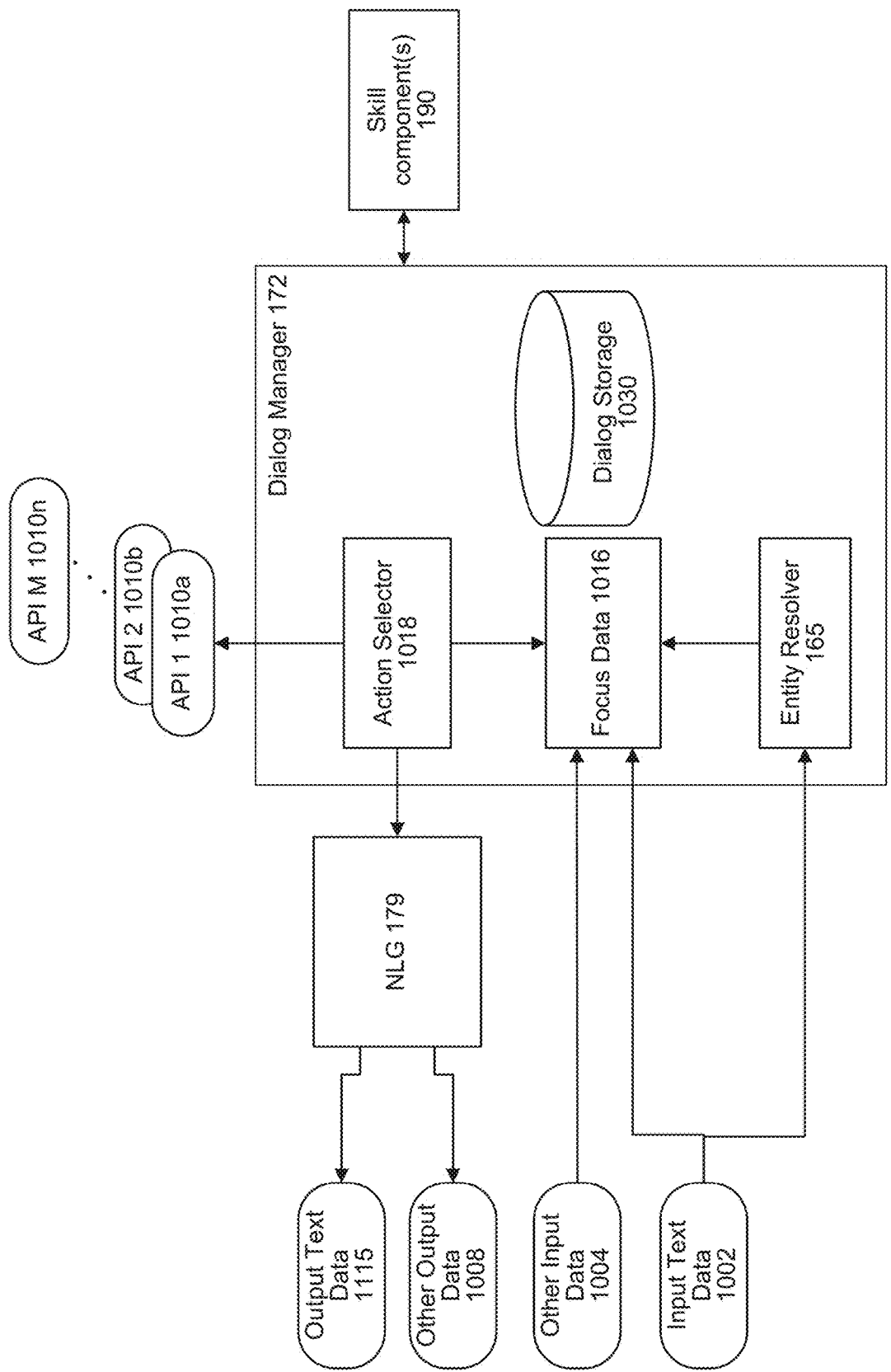
FIG. 10 is a conceptual diagram of components of a dialog manager component, according to embodiments of the present disclosure.

FIG. 10 illustrate operations to handle dialog management, according to embodiments of the present disclosure. One or more components shown in FIG. 10 may be part of the dialog manager 172. For example, the dialog manager 172 may include the entity resolution comonent 165, the focus data component 1016 and the action selector 1018. The dialog manager 172 may work in concert with other language processing components, for example NLU 160 and/or the VUI skill component 190a, or may operate instead of such components in certain embodiments.

The system receives input text data 1002 which may be received, for example, by a device (e.g., 113) or from another component of the system (for example as ASR output data 710). The input text data 1002 may include text corresponding to a user input and metadata indicating further information about the text (such as an identity of the user for example determined by a user recognition component), an emotional state of the user (for example determined by a sentiment detection component, etc.). The input text data 1002 may be text representing words, instructions, markup language, speech, or gestures, or may be a vector or other representation of the same. The input text data 1002 may be generated by a user via a keyboard, touchscreen, microphone, camera, or other such input device. In other embodiments, the input text data 1002 is created using ASR, as described above, from audio data received from a user. The system may further receive other input data 1004, which may correspond to a button press, gesture, or other input, such as image data as may interpreted by device 110, system component 120, or other component (for example, an image processing component). As described in greater detail below, using the input text data 1002 and/or other input data 1004, the system may determine and output text data 1115 and/or other output data 1008. The system may instead or in addition perform an action based on the input text data 1002 and/or other input data 1004, such as calling one or more APIs 1010.

An entity resolution component 165 may be used to determine that the input text data 1002 includes a representation of one or more entities, a process that may include named entity recognition (NER)—i.e., determining that the input text data 1002 includes the representation—and entity resolution (ER)—i.e., identifying a meaning or context of the entity, such as associating an identity of a person based on a recognized nickname. An entity may be a person, place, thing, idea, and/or goal; example entities include proper names, nicknames, business names, place names, and/or application names. The entity resolution component 165 may operate similarly to NER component 862 and/or entity resolution component 165 discussed herein with regard to NLU operations.

In some embodiments, a single entity resolution component 165 is used for more than one domain (i.e., a "cross-domain" entity resolution component 165). Each domain may correspond to one or more dialog models. One or more candidate domains corresponding to the input text data 1002 may be determined; entity resolution components 165 corresponding to the candidate domains may be used to process the input text data 1002. The dialog focus data 1016 may store the output entities from each candidate domain and may remove unselected entities when an API 1010 is selected or an action to be performed is determined.

The dialog focus data 1016 may store state data (for example in dialog storage 1030) corresponding to dialog history data (including an intent(s), an entity(ies), etc. corresponding to a prior turn in the dialog), action history data, and/or other data. In some embodiments, the other components (e.g., the action selector 1018) do not store state data and instead query the dialog focus data 1016 for the state data. The system may send some or all of the dialog focus data 1016 to other systems and/or may receive additional dialog focus data from other systems. In some embodiments, the other components (e.g., the action selector 1018) include a feature-extractor component to extract features from the dialog focus data 1016.

The dialog focus data 1016 may be graph-based data including a plurality of graph nodes; each graph node may correspond to an item of state data, such as an entity type, entity value, prior API call, and/or user data. The other components, such as the action selector 1018, may access all of the graph nodes of the dialog focus data 1016 or may access only a subset of the graph nodes of the dialog focus data 1016. The dialog focus data 1016 may be any type of storage mechanism and may serve as long-term and/or short term memory for the system, thus enabling tracking of entities, ASR output, TTS output, and other features) at each turn through a dialog. In some embodiments, the dialog focus data 1016 is updated after each turn of dialog with updated dialog focus data; in other embodiments, the dialog focus data 1016 is updated after an end of a dialog is determined.

The entity resolution component 165 may utilize gazetteer information stored in an entity library storage. The gazetteer information may be used to match text data (representing a portion of the user input) with text data representing known entities, such as song titles, contact names, etc. Gazetteers may be linked to users (e.g., a particular gazetteer may be associated with a specific user's music collection), may be linked to certain skill components 190 (e.g., a shopping skill, a music skill, a video skill, etc.), or may be organized in a variety of other ways.

The entity resolution component 165 may include a ranker component. The ranker component may assign a particular confidence score to each hypothesis input therein. The confidence score of a hypothesis may represent a confidence of the system in the processing performed with respect to the hypothesis. The confidence score of a particular hypothesis may be affected by whether the hypothesis has unfilled slots. For example, if a hypothesis associated with a first skill component includes slots that are all filled/resolved, that NLU hypothesis may be assigned a higher confidence score than another hypothesis including at least some slots that are unfilled/unresolved by the entity resolution component 165.

The focus data 1016 may store data relevant to a dialog. In various embodiments, the dialog focus data 1016 stores the input text data 1002, other input data 1004, entity data from the entity resolution component 165 and/or action data and dialog data from an action selector 1018. The dialog focus data 1016 may further include additional information, such as location data, user preference data, and environment data. In various embodiments, the dialog focus data 1016 uses an encoder to encode some or all of the received data into one or more feature vectors and a decoder to determine, based on the feature vectors, intent data corresponding to an intent of a user. The dialog focus data 1016 may further include state data that represents prior dialog, actions, or other prior user information or data.

The action selector 1018 determines an action to be performed in response to the user request, where the action may include calling an API to perform an action and/or presenting an output to the user. The action selector 1018 may include a trained model(s), and may process the dialog focus data 1016. If the action selector 1018 determines to invoke an API call, one or more APIs 1010 may be activated and a corresponding action carried out. If the action selector 1018 determines to present a prompt or other output data to the user, the NLG component 179 may be used to generate the output text data 1115 and/or other output data 1008. In either case, the action selection 1018 may update the dialog focus data 1016 based on the API call or the output presented to the user.

In some embodiments, the action selector 1018 may process data from the dialog storage 1030 to select one or more skill components 190/skill system component(s) 125 capable of responding to the user request, and present the selected skill to the user using the output text data 1115.

In some embodiments, the system component(s) 120 may determine past interaction data, such as a satisfaction rating corresponding to skill component(s) 190 and store it in the storage 1030. The satisfaction rating may be based on past interactions between users of the system component(s) 120 and the skill. In some embodiments, the system component(s) 120 may determine a user-specific satisfaction rating corresponding to the skill based on user-specific data, interaction-specific data and/or focus data 1016, such as, user profile data 170 associated with the specific user, location data, past user interactions with the system component(s) 120, past user interactions with the skill component 190, user preferences, device type for the device 110 that received the user request, device type for the device 110 that may output/respond to the user request, device capabilities, dialog state of previous turns in the dialog, and other data.

In some embodiments, users may provide feedback to the system component(s) 120 or the skill system component(s) 125 indicating the user's satisfaction in the service skill responding to the user request/performing an action in response to the user request. The feedback may be solicited by the system component(s) 120 or the skill system component(s) 125. In some cases, the feedback may be explicit feedback and may be received as a voice input, text input, gestures, or other types of input. In other cases, the feedback may be implicit feedback and may be determined by processing data related to the user interaction, such as, image data representing the user's facial expression, audio data (representing an utterance from the user) indicating a sentiment/emotion of the user, text data (representing the user input) indicating a sentiment of the user, other sounds/speech indicating the user's emotions/feelings/sentiment (e.g., "ugh" indicating frustration), and other types of data.

The action selector 1018 may select a skill based on various other factors, including but not limited to, a user's age, user cohort (user affinities or other social organizations), location information (e.g., where the user input originated, where the user intends to travel to, etc.), skill location data, intent, intent type, time of day the user input is received, time of year the user input is received, and others.

The action selector 1018 may select a skill based on skill availability, for example, a reservations at a restaurant may indicate availability or no availability for a particular day. The system component(s) 120/action selector 1018 may determine the number of diners at a restaurant or the number of takeout orders a restaurant is handling based on the number of user requests the system component(s) 120 routed to the skill. In another example, the system component(s) 120/action selector 1018 may determine that a number of user requests were routed to a first skill for a first location/geographic area (e.g., a city), and may determine to route the next/future user requests to another skill for that geographic area.

For a restaurant reservation, the action selector 1018 may select a skill based on a number of people in the user's party, since some restaurants may not make reservations for small parties less than a particular number. The action selector 1018 may select a skill based on person(s) other than the user that may be involved in the user request. For example, if the user says "Alexa, what should we do tomorrow?" the system component(s) 120 may determine information relating to the other persons in the user's household to select a skill.

The action selector 1018 may select a skill based on the dialog state where the dialog state indicates multiple turns/attempts to recommend a skill/service provider, and the action selector 1018 may modify the search criteria (e.g., expand the zip code, expand the time frame, etc.) to select a skill.

Figure 11:
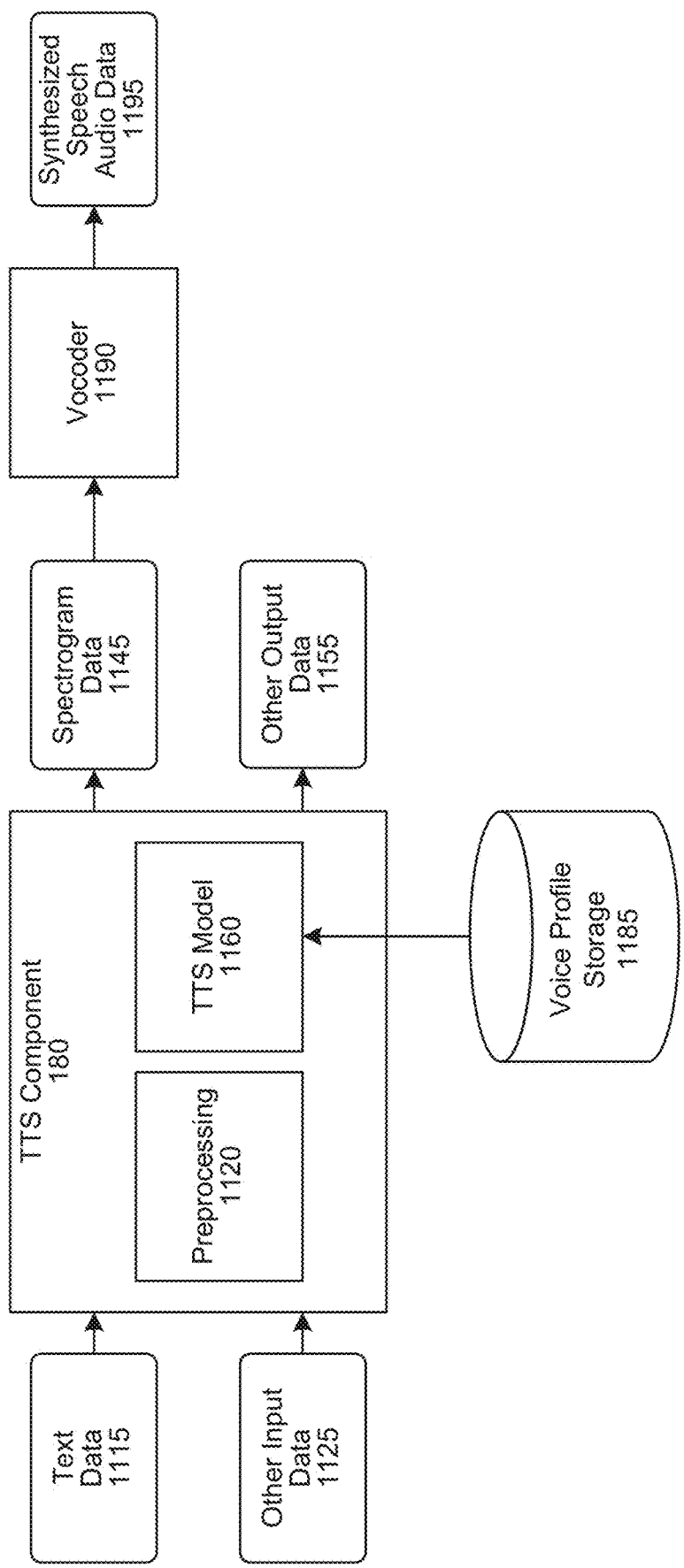
FIG. 11 is a conceptual diagram of text-to-speech components according to embodiments of the present disclosure.

Components of a system that may be used to perform unit selection, parametric TTS processing, and/or model-based audio synthesis are shown in FIG. 11. FIG. 11 is a conceptual diagram that illustrates operations for generating synthesized speech using a TTS component 180, according to embodiments of the present disclosure. The TTS component 180 may receive text data 1115 and process it using one or more TTS models 1160 to generate synthesized speech in the form of spectrogram data 1145. A vocoder 1190 may convert the spectrogram data 1145 into output speech audio data 1195, which may represent a time-domain waveform suitable for amplification and output as audio (e.g., from a loudspeaker).

The TTS component 180 may additionally receive other input data 1125. The other input data 1125 may include, for example, identifiers and/or labels corresponding to a desired speaker identity, voice characteristics, emotion, speech style, etc. desired for the synthesized speech. In some implementations, the other input data 1125 may include text tags or text metadata, that may indicate, for example, how specific words should be pronounced, for example by indicating the desired output speech quality in tags formatted according to the speech synthesis markup language (SSML) or in some other form. For example, a first text tag may be included with text marking the beginning of when text should be whispered (e.g., <begin whisper>) and a second tag may be included with text marking the end of when text should be whispered (e.g., <end whisper>). The tags may be included in the text data 1115 and/or the other input data 1125 such as metadata accompanying a TTS request and indicating what text should be whispered (or have some other indicated audio characteristic).

The TTS component 180 may include a preprocessing component 1120 that can convert the text data 1115 and/or other input data 1125 into a form suitable for processing by the TTS model 1160. The text data 1115 may be from, for example an application, a skill component (described further below), an NLG component, another device or source, or may be input by a user. The text data 1115 received by the TTS component 180 may not necessarily be text, but may include other data (such as symbols, code, other data, etc.) that may reference text (such as an indicator of a word and/or phoneme) that is to be synthesized. The preprocessing component 1120 may transform the text data 1115 into, for example, a symbolic linguistic representation, which may include linguistic context features such as phoneme data, punctuation data, syllable-level features, word-level features, and/or emotion, speaker, accent, or other features for processing by the TTS component 180. The syllable-level features may include syllable emphasis, syllable speech rate, syllable inflection, or other such syllable-level features; the word-level features may include word emphasis, word speech rate, word inflection, or other such word-level features. The emotion features may include data corresponding to an emotion associated with the text data 1115, such as surprise, anger, or fear. The speaker features may include data corresponding to a type of speaker, such as sex, age, or profession. The accent features may include data corresponding to an accent associated with the speaker, such as Southern, Boston, English, French, or other such accent. Style features may include a book reading style, poem reading style, a news anchor style, a sports commentator style, various singing styles, etc.

The preprocessing component 1120 may include functionality and/or components for performing text normalization, linguistic analysis, linguistic prosody generation, or other such operations. During text normalization, the preprocessing component 1120 may first process the text data 1115 and generate standard text, converting such things as numbers, abbreviations (such as Apt., St., etc.), symbols ($, %, etc.) into the equivalent of written out words.

During linguistic analysis, the preprocessing component 1120 may analyze the language in the normalized text to generate a sequence of phonetic units corresponding to the input text. This process may be referred to as grapheme-to-phoneme conversion. Phonetic units include symbolic representations of sound units to be eventually combined and output by the system as speech. Various sound units may be used for dividing text for purposes of speech synthesis. In some implementations, the TTS model 1160 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in a storage component. The linguistic analysis performed by the preprocessing component 1120 may also identify different grammatical components such as prefixes, suffixes, phrases, punctuation, syntactic boundaries, or the like. Such grammatical components may be used by the TTS component 180 to craft a natural-sounding audio waveform output. The language dictionary may also include letter-to-sound rules and other tools that may be used to pronounce previously unidentified words or letter combinations that may be encountered by the TTS component 180. Generally, the more information included in the language dictionary, the higher quality the speech output.

The output of the preprocessing component 1120 may be a symbolic linguistic representation, which may include a sequence of phonetic units. In some implementations, the sequence of phonetic units may be annotated with prosodic characteristics. In some implementations, prosody may be applied in part or wholly by a TTS model 1160. This symbolic linguistic representation may be sent to the TTS model 1160 for conversion into audio data (e.g., in the form of Mel-spectrograms or other frequency content data format).

The TTS component 180 may retrieve one or more previously trained and/or configured TTS models 1160 from the voice profile storage 1185. A TTS model 1160 may be, for example, a neural network architecture that may be described as interconnected artificial neurons or "cells" interconnected in layers and/or blocks. In general, neural network model architecture can be described broadly by hyperparameters that describe the number of layers and/or blocks, how many cells each layer and/or block contains, what activations functions they implement, how they interconnect, etc. A neural network model includes trainable parameters (e.g., "weights") that indicate how much weight (e.g., in the form of an arithmetic multiplier) a cell should give to a particular input when generating an output. In some implementations, a neural network model may include other features such as a self-attention mechanism, which may determine certain parameters at run time based on inputs rather than, for example, during training based on a loss calculation. The various data that describe a particular TTS model 1160 may be stored in the voice profile storage 1185. A TTS model 1160 may represent a particular speaker identity and may be conditioned based on speaking style, emotion, etc. In some implementations, a particular speaker identity may be associated with more than one TTS model 1160; for example, with a different model representing a different speaking style, language, emotion, etc. in some implementations, a particular TTS model 1160 may be associated with more than one speaker identity; that is, be able to produce synthesized speech that reproduces voice characteristics of more than one character. Thus a first TTS model 1160*a* may be used to create synthesized speech for the first speech-processing system component 120*a* while a second, different, TTS model 1160*b* may be used to create synthesized speech for the second speech-processing system component 120*b*. In some cases, the TTS model 1160 may generate the desired voice characteristics based on conditioning data received or determined from the text data 1115 and/or the other input data 1125. For example a synthesized voice of the first speech-processing system component 120*a* may be different from a synthesized voice of the second speech-processing system component 120*b*.

The TTS component 180 may, based on an indication received with the text data 1115 and/or other input data 1125, retrieve a TTS model 1160 from the voice profile storage 1185 and use it to process input to generate synthesized speech. The TTS component 180 may provide the TTS model 1160 with any relevant conditioning labels to generate synthesized speech having the desired voice characteristics. The TTS model 1160 may generate spectrogram data 1145 (e.g., frequency content data) representing the synthesized speech, and send it to the vocoder 1190 for conversion into an audio signal.

The TTS component 180 may generate other output data 1155. The other output data 1155 may include, for example, indications or instructions for handling and/or outputting the synthesized speech. For example, the text data 1115 and/or other input data 1125 may be received along with metadata, such as SSML tags, indicating that a selected portion of the text data 1115 should be louder or quieter. Thus, the other output data 1155 may include a volume tag that instructs the vocoder 1190 to increase or decrease an amplitude of the output speech audio data 1195 at times corresponding to the selected portion of the text data 1115. Additionally or alternatively, a volume tag may instruct a playback device to raise or lower a volume of the synthesized speech from the device's current volume level, or lower a volume of other media being output by the device (e.g., to deliver an urgent message).

The vocoder 1190 may convert the spectrogram data 1145 generated by the TTS model 1160 into an audio signal (e.g., an analog or digital time-domain waveform) suitable for amplification and output as audio. The vocoder 1190 may be, for example, a universal neural vocoder based on Parallel WaveNet or related model. The vocoder 1190 may take as input audio data in the form of, for example, a Mel-spectrogram with 80 coefficients and frequencies ranging from 50 Hz to 12 kHz. The synthesized speech audio data 1195 may be a time-domain audio format (e.g., pulse-code modulation (PCM), waveform audio format (WAV), u-law, etc.) that may be readily converted to an analog signal for amplification and output by a loudspeaker. The synthesized speech audio data 1195 may consist of, for example, 8-, 16-, or 24-bit audio having a sample rate of 16 kHz, 24 kHz, 44.1 kHz, etc. In some implementations, other bit and/or sample rates may be used.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

FIG. 12 is a block diagram conceptually illustrating a device 110 that may be used with the system. FIG. 13 is a block diagram conceptually illustrating example components of a remote device, such as the natural language command processing system component 120, which may assist with ASR processing, NLU processing, etc., and a skill system component 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the device 110 may operate locally to a user (e.g., within a same environment so the device may receive inputs and playback outputs for the user) the server/system component 120 may be located remotely from the device 110 as its operations may not require proximity to the user. The server/system component 120 may be located in an entirely different location from the device 110 (for example, as part of a cloud computing system or the like) or may be located in a same environment as the device 110 but physically separated therefrom (for example a home server or similar device that resides in a user's home or business but perhaps in a closet, basement, attic, or the like). In some implementations, the system component 120 may also be a version of a user device 110 that includes different (e.g., more) processing capabilities than other user device(s) 110 in a home/office. One benefit to the server/system component 120 being in a user's home/business is that data used to process a command/return a response may be kept within the user's home, thus reducing potential privacy concerns.

Multiple systems (120/125) may be included in the overall system 100 of the present disclosure, such as one or more natural language processing system components 120 for performing ASR processing, one or more natural language processing system components 120 for performing NLU processing, one or more skill system components 125, etc. In operation, each of these systems may include computer-readable and computer-executable instructions that reside on the respective device (120/125), as will be discussed further below.

Each of these devices (110/120/125) may include one or more controllers/processors (1204/1304), which may each include a central processing unit (CPU) for processing data and computer-readable instructions, and a memory (1206/1306) for storing data and instructions of the respective device. The memories (1206/1306) may individually include volatile random access memory (RAM), non-volatile read only memory (ROM), non-volatile magnetoresistive memory (MRAM), and/or other types of memory. Each device (110/120/125) may also include a data storage component (1208/1308) for storing data and controller/processor-executable instructions. Each data storage component (1208/1308) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1202/1302).

Computer instructions for operating each device (110/120/125) and its various components may be executed by the respective device's controller(s)/processor(s) (1204/1304), using the memory (1206/1306) as temporary "working" storage at runtime. A device's computer instructions may be stored in a non-transitory manner in non-volatile memory (1206/1306), storage (1208/1308), or an external device(s). Alternatively, some or all of the executable instructions may be embedded in hardware or firmware on the respective device in addition to or instead of software.

Each device (110/120/125) includes input/output device interfaces (1202/1302). A variety of components may be connected through the input/output device interfaces (1202/1302), as will be discussed further below. Additionally, each device (110/120/125) may include an address/data bus (1224/1324) for conveying data among components of the respective device. Each component within a device (110/120/125) may also be directly connected to other components in addition to (or instead of) being connected to other components across the bus (1224/1324).

Referring to FIG. 12, the device 110 may include input/output device interfaces 1202 that connect to a variety of components such as an audio output component such as a speaker 1212, a wired headset or a wireless headset (not illustrated), or other component capable of outputting audio. The device 110 may also include an audio capture component. The audio capture component may be, for example, a microphone 122 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1216 for displaying content. The device 110 may further include a camera 1218.

Via antenna(s) 1222, the input/output device interfaces 1202 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1202/1302) may also include communication components that allow data to be exchanged between devices such as different physical servers in a collection of servers or other components.

The components of the device(s) 110, the natural language command processing system component 120, or a skill system component 125 may include their own dedicated processors, memory, and/or storage. Alternatively, one or more of the components of the device(s) 110, the natural language command processing system component 120, or a skill system component 125 may utilize the I/O interfaces (1202/1302), processor(s) (1204/1304), memory (1206/1306), and/or storage (1208/1308) of the device(s) 110, natural language command processing system component 120, or the skill system component 125, respectively. Thus, the ASR component 150 may have its own I/O interface(s), processor(s), memory, and/or storage; the NLU component 160 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language command processing system component 120, and a skill system component 125, as described herein, are illustrative, and may be located as a stand-alone device or may be included, in whole or in part, as a component of a larger device or system. As can be appreciated, a number of components may exist either on a system component 120 and/or on device 110. For example, the language processing components 192 (which may include the ASR component 150 and the NLU component 160), the language output components 193 (which may include the NLG component 179 and the TTS component 180), etc., for example as illustrated in FIG. 1. Unless expressly noted otherwise, the system version of such components may operate similarly to the device version of such components and thus the description of one version (e.g., the system version or the local version) applies to the description of the other version (e.g., the local version or system version) and vice-versa.

As illustrated in FIG. 14, multiple devices (110a-110n, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a speech-detection device with display 110f, a display/smart television 110g, a washer/dryer 110h, a refrigerator 110i, a microwave 110j, autonomously motile device 110k (e.g., a robot), etc., may be connected to the network(s) 199 through a wireless service provider, over a Wi-Fi or cellular network connection, or the like. Other devices are included as network-connected support devices, such as the natural language command processing system component 120, the skill system component(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 150, the NLU component 160, etc. of the natural language command processing system component 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
receiving, from a user device, first audio data;
performing speech processing using the first audio data to determine first intent data representing a request to receive first media content;
sending, to a first system component corresponding to the first media content, first data representing a request to send the first media content to the user device;
receiving, from the user device, a first identifier corresponding to the first media content;
sending, to a context storage, the first identifier;
receiving, from the user device, second audio data;
performing speech processing using the second audio data to determine second intent data representing a request to send a media comment;
in response to determining the second intent data, sending, to a second system component, second data representing a request to receive the media comment from the user device;
determining, using the first identifier, to send the media comment to a third system component associated with a creator of the first media content;
causing, by the second system component, the user device to output first synthesized speech representing a first indication to begin recording the media comment;
receiving, from the user device, third audio data representing the media comment;
receiving a second indication to send the media comment; and
sending, to the third system component based on the second indication, a notification that a new media comment is available.

2. The computer-implemented method of claim 1, further comprising:
determining, based on processing the second audio data, that the second audio data does not indicate a destination for the media comment;
in response to determining that the second audio data does not indicate a destination for the media comment, sending the first identifier to the second system component;
causing, by the second system component, the user device to output second synthesized speech representing a request to confirm that the media comment is to be sent to a creator of the first media content;
receiving third audio data in response to the second synthesized speech; and
processing the third audio data to determine the second indication, the second indication representing a user confirmation that the media comment is to be sent to the creator.

3. A computer-implemented method comprising:
receiving, from a user device, first audio data;
processing the first audio data to determine first intent data representing a request to send a media comment;
in response to determining the first intent data, sending, to a first system component, first data representing a request to receive the media comment from the user device;
receiving a first identifier of first media content output by the user device;

determining, using the first identifier, a second system component corresponding to a creator of the first media content;

causing the user device to output first synthesized speech representing an instruction to begin recording the media comment;

receiving second audio data representing the media comment; and sending, to the second system component, a notification that a new media comment is available.

4. The computer-implemented method of claim 3, further comprising:

prior to sending the notification to the second system component, causing the user device to output second synthesized speech representing a request to confirm that the media comment is to be sent to the creator; and receiving a second indication of a user confirmation that the media comment is to be sent to the creator.

5. The computer-implemented method of claim 3, further comprising:

causing, by the first system component, the user device to output second synthesized speech representing a request to indicate a destination for the media comment;

receiving third audio data in response to the second synthesized speech; and processing the third audio data to determine a second indication to send the media comment to the creator.

6. The computer-implemented method of claim 3, further comprising:

causing, by the first system component, the user device to output second synthesized speech representing options for handling the second audio data, the options including reviewing, sending, or deleting the second audio data;

receiving third audio data representing a response to the second synthesized speech;

determining, using the third audio data, a user request to review the second audio data;

causing the user device to output the second audio data; and receiving, following output of the second audio data, a first indication to send the media comment.

7. The computer-implemented method of claim 3, further comprising:

prior to sending the notification, sending, to a third system component, third data representing a transcript of the media comment; and processing, using the third system component, the third data to determine that the media comment does not contain prohibited content.

8. The computer-implemented method of claim 3, further comprising:

generating, by the second system component, second media content, the second media content including a representation of the second audio data; and sending the second media content to a plurality of additional user devices.

9. The computer-implemented method of claim 3, further comprising:

in response to sending the second audio data to the second system component, sending, to a second device associated with the creator of the first media content, a notification that the media comment is available.

10. The computer-implemented method of claim 3, further comprising:

causing, by the first system component, the user device to output second synthesized speech representing a request to confirm that the media comment is to be sent to the creator of the first media content;

receiving third audio data in response to the second synthesized speech; and processing the third audio data to determine a second indication of a user confirmation that the media comment is to be sent to the creator.

11. The computer-implemented method of claim 10, wherein the first media content includes a representation of an invitation to send media comments to the creator.

12. A system comprising:

at least one processor; and at least one memory including instructions that, when executed by the at least one processor, cause the system to:

receive, from a user device, first audio data;

process the first audio data to determine first intent data representing a request to send a media comment;

in response to determining the first intent data, send, to a first system component, first data representing a request to receive the media comment from the user device;

receive a first identifier of first media content output by the user device;

determine, using the first identifier, a second system component corresponding to a creator of the first media content;

cause the user device to output first synthesized speech representing an instruction to begin recording the media comment;

receive second audio data representing the media comment; and send, to the second system component, a notification that a new media comment is available.

13. The system of claim 12, wherein the at least one memory includes further instructions that, when executed by the at least one processor, further cause the system to:

prior to sending the notification to the second system component, cause the user device to output second synthesized speech representing a request to confirm that the media comment is to be sent to the creator; and receive a second indication of a user confirmation that the media comment is to be sent to the creator.

14. The system of claim 12, wherein the at least one memory includes further instructions that, when executed by the at least one processor, further cause the system to:

cause, by the first system component, the user device to output second synthesized speech representing a request to indicate a destination for the media comment;

receive third audio data in response to the second synthesized speech; and process the third audio data to determine a second indication to send the media comment to the creator.

15. The system of claim 12, wherein the at least one memory includes further instructions that, when executed by the at least one processor, further cause the system to:

cause, by the first system component, the user device to output second synthesized speech representing options for handling the second audio data, the options including reviewing, sending, or deleting the second audio data;

receive third audio data representing a response to the second synthesized speech;
determine, using the third audio data, a user request to review the second audio data;
cause the user device to output the second audio data; and
receive, following output of the second audio data, a first indication to send the media comment.

16. The system of claim 12, wherein the at least one memory includes further instructions that, when executed by the at least one processor, further cause the system to:
prior to sending the notification, send, to a third system component, third data representing a transcript of the media comment; and
process, using the third system component, the third data to determine that the media comment does not contain prohibited content.

17. The system of claim 12, wherein the at least one memory includes further instructions that, when executed by the at least one processor, further cause the system to:
generate, by the second system component, second media content, the second media content including a representation of the second audio data; and
send the second media content to a plurality of additional user devices.

18. The system of claim 12, wherein the at least one memory includes further instructions that, when executed by the at least one processor, further cause the system to:
in response to sending the second audio data to the second system component, send, to a second device associated with the creator of the first media content, a notification that the media comment is available.

19. The system of claim 12, wherein the at least one memory includes further instructions that, when executed by the at least one processor, further cause the system to:
cause, by the first system component, the user device to output second synthesized speech representing a request to confirm that the media comment is to be sent to the creator of the first media content;
receive third audio data in response to the second synthesized speech; and
process the third audio data to determine a second indication of a user confirmation that the media comment is to be sent to the creator.

20. The system of claim 12, wherein the first media content includes a representation of an invitation to send media comments to the creator.

* * * * *